(12) United States Patent
Chawla et al.

(10) Patent No.: US 12,455,775 B2
(45) Date of Patent: Oct. 28, 2025

(54) DATA PROCESSING PATH DATA TRANSFORMATION SYSTEM

(71) Applicant: Dell Products L.P., Round Rock, TX (US)

(72) Inventors: Gaurav Chawla, Austin, TX (US);
John Cardente, Milford, MA (US);
John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 504 days.

(21) Appl. No.: 18/150,453

(22) Filed: Jan. 5, 2023

(65) Prior Publication Data
US 2024/0231931 A1   Jul. 11, 2024

(51) Int. Cl.
*G06F 9/46*   (2006.01)
*G06F 9/50*   (2006.01)
(52) U.S. Cl.
CPC ...... *G06F 9/5066* (2013.01); *G06F 2209/502* (2013.01); *G06F 2209/509* (2013.01)
(58) Field of Classification Search
None
See application file for complete search history.

(56) References Cited

U.S. PATENT DOCUMENTS

| 7,953,891 B2 | 5/2011 | Blaszczak et al. |
| 2016/0085587 A1* | 3/2016 | Dube ............... G06F 9/4881 718/104 |
| 2021/0124618 A1* | 4/2021 | Xie ............... G06F 9/44505 |
| 2023/0385103 A1* | 11/2023 | Zheng ............... G06F 9/541 |

* cited by examiner

*Primary Examiner* — Bing Zhao
(74) *Attorney, Agent, or Firm* — Joseph Mencher

(57) ABSTRACT

A data transformation/processing system includes a data transformation/processing management device coupled to a client device, processing systems, memory systems, and storage systems. The data transformation/processing management device receives a request from the client device to process first data to generate second data, determines a first subset of the processing systems for performing processing operations to process the first data, and identifies a data path for the processing operations that includes storage locations provided by subsets of the memory systems and the storage systems. The data transformation/processing management device then determines a second subset of the processing systems in the data path for performing transformation operations to transform the first data for processing and storage in the storage locations, and configures the first subset of the processing systems to perform the processing operations and the second subset of the processing systems to perform the transformation operations.

20 Claims, 22 Drawing Sheets

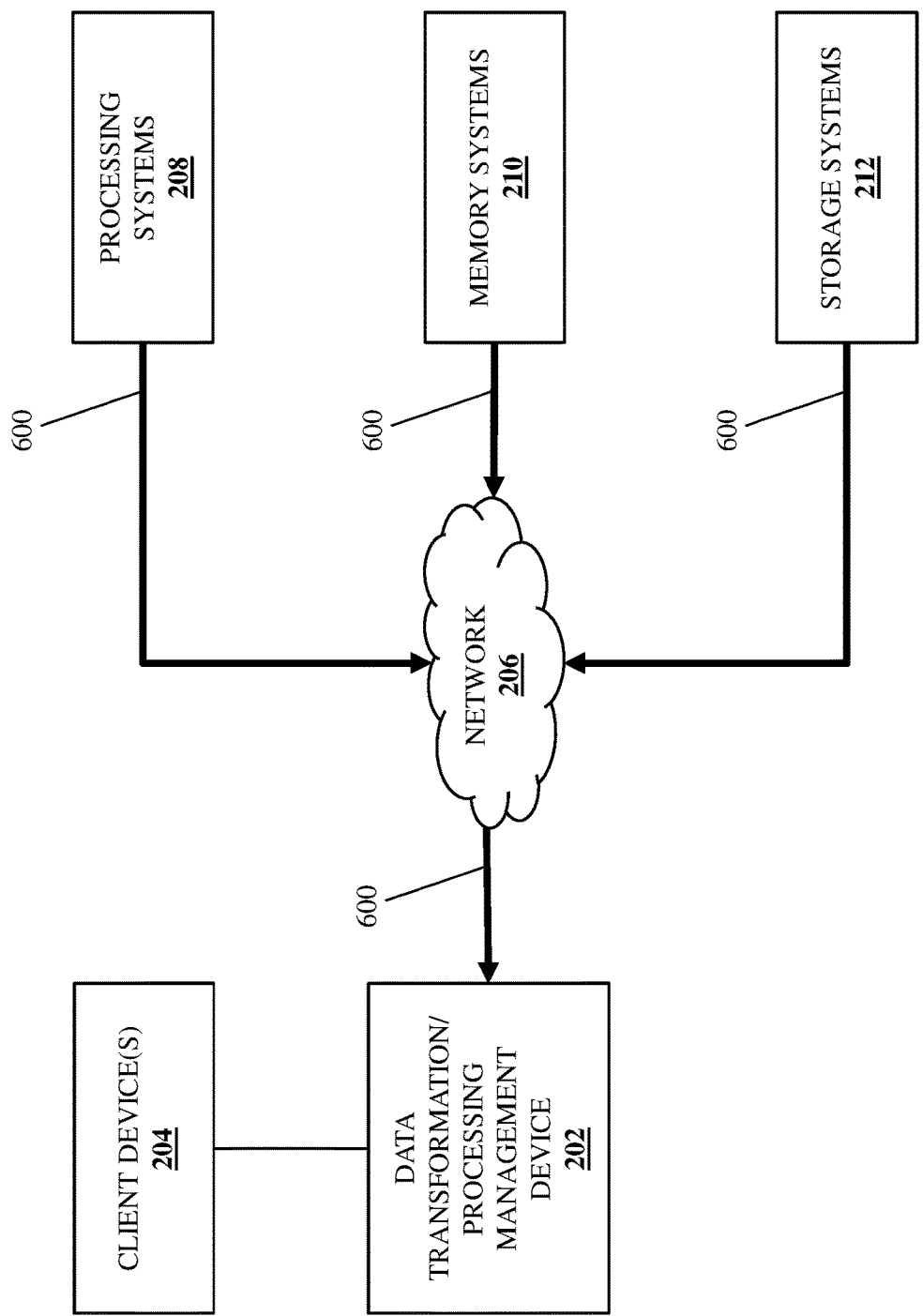

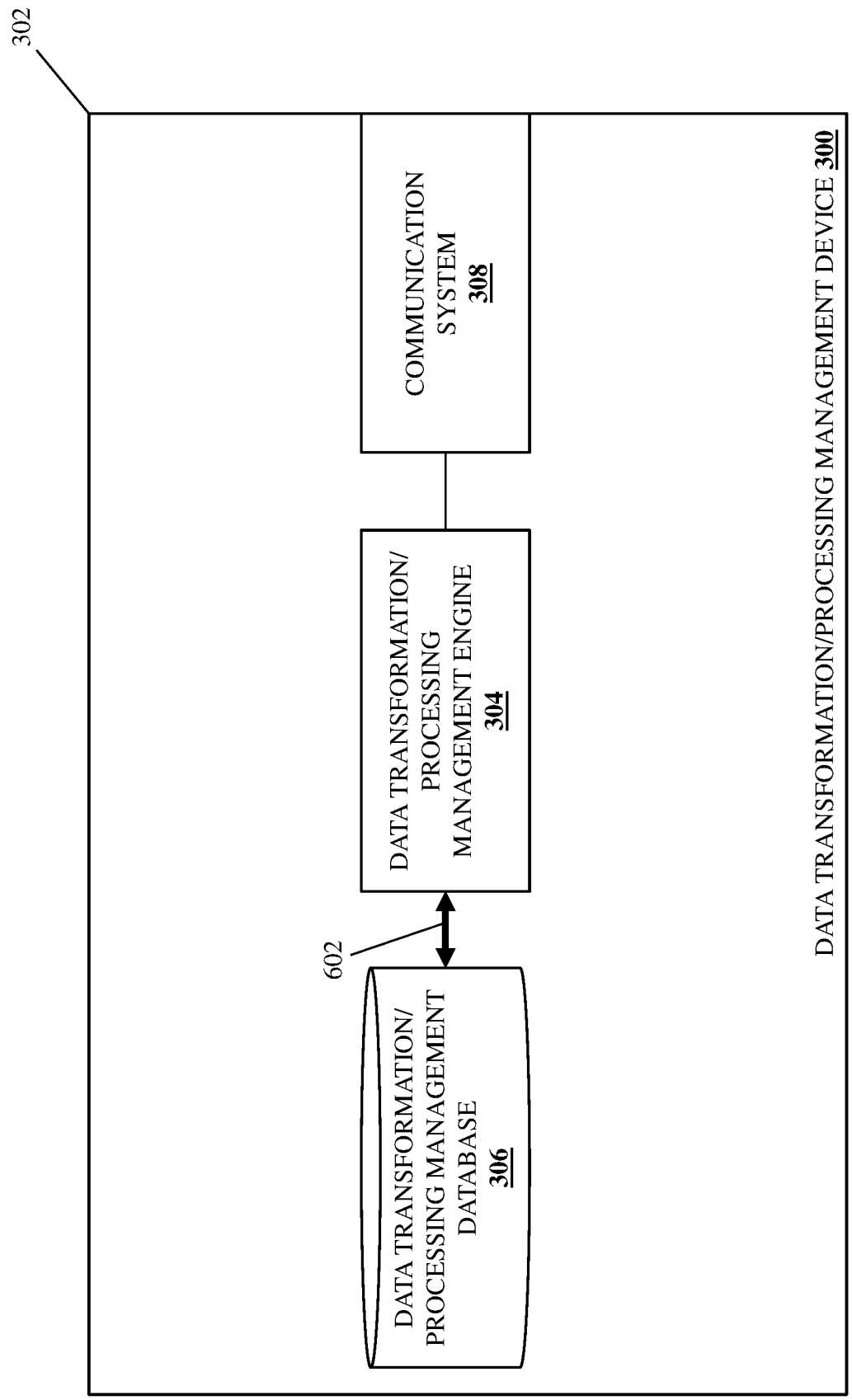

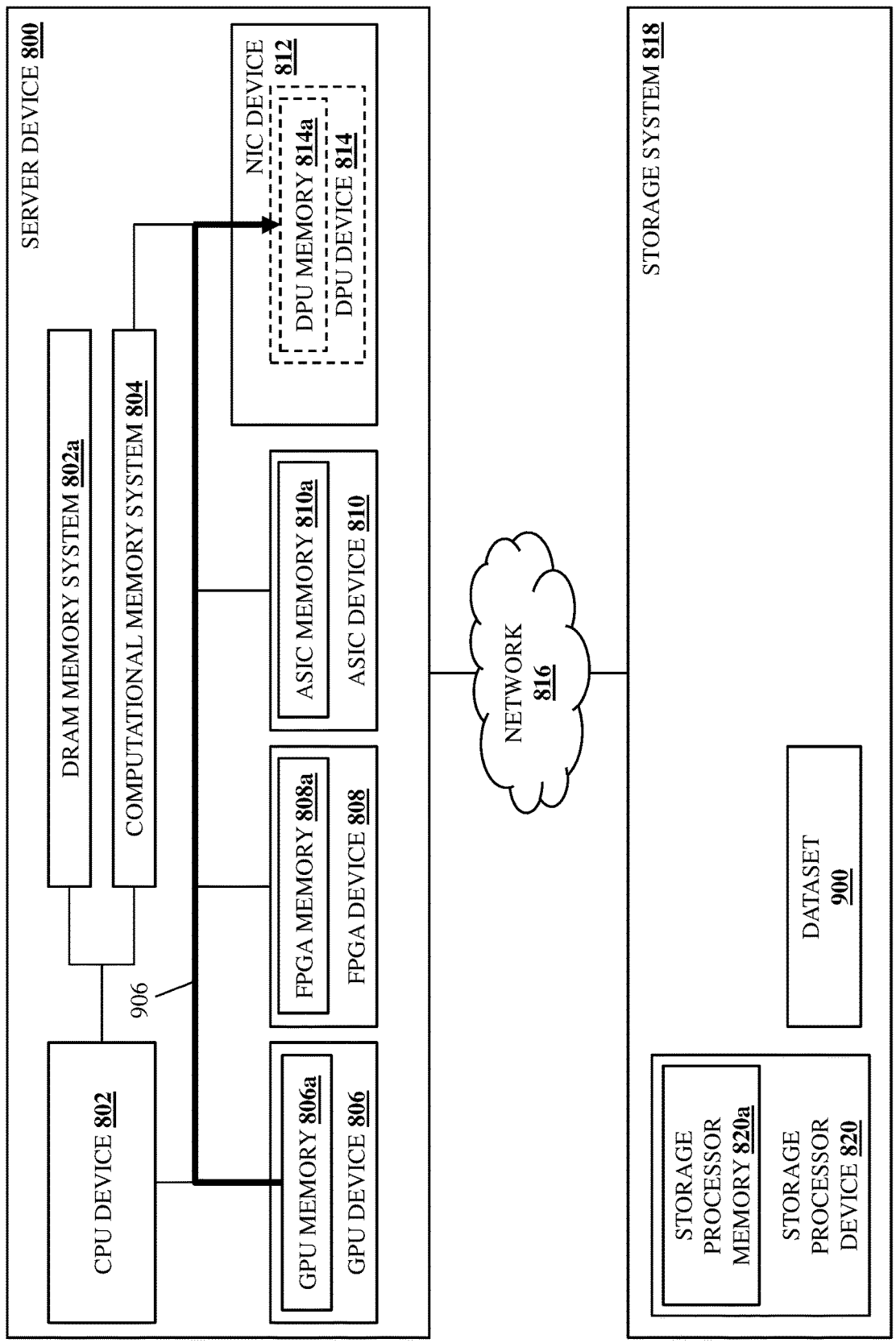

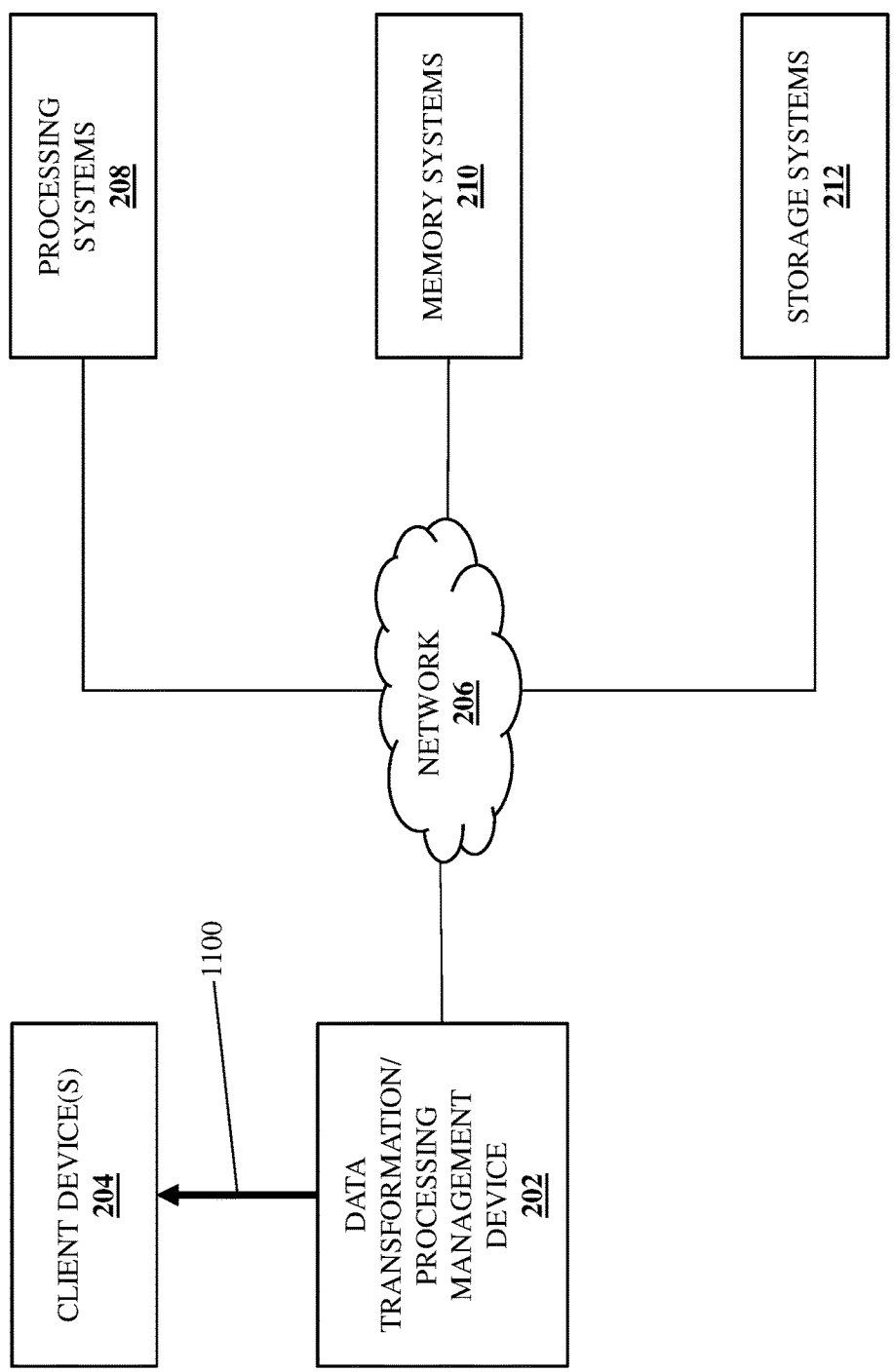

DATA PROCESSING PATH DATA TRANSFORMATION SYSTEM

BACKGROUND

The present disclosure relates generally to information handling systems, and more particularly to the transformation and processing of data by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes utilize multiple processing systems to process data. For example, a Graphics Processing Unit (GPU) processing system may be utilized to offload processing operations from a Central Processing Unit (CPU) processing system, and such offloading operations typically include the CPU processing system retrieving data from a data source storage location, storing that data in a CPU memory device, and sending an instruction to the GPU processing system to process the data stored in the CPU memory device, with the GPU device retrieving the data stored in the CPU memory device, storing that data in a GPU memory device, and processing that data stored in the GPU memory device. When the CPU device determines that the GPU processing system has processed the data stored in the GPU memory device, it retrieves the data from the GPU memory device and stores that data in a data destination storage location. Such conventional data processing/offload operations suffer from several inefficiencies that are exacerbated in distributed computing paradigms that include a variety of different processing systems that may be used to process data.

Accordingly, it would be desirable to provide a data processing system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a data transformation/processing management engine that is configured to: receive, from a client device, a request to process first data to generate second data; determine a first subset of a plurality of processing systems for performing processing operations to process the first data; identify a data path for performing the processing operations by the first subset of the plurality of processing systems that includes storage locations provided by a first subset of a plurality of memory systems and a first subset of a plurality of storage systems; determine a second subset of the plurality of processing systems in the data path for performing transformation operations to transform the first data for processing and storage in the storage locations; and configure the first subset of the plurality of processing systems to perform the processing operations and the second subset of the plurality of processing systems to perform the transformation operations.

BRIEF DESCRIPTION OF THE DRAWINGS

FIG. 6A is a schematic view illustrating an embodiment of the data transformation/processing system of FIG. 2 operating during the method of FIG. 4.

FIG. 6C is a schematic view illustrating an embodiment of the data transformation/processing management device of FIG. 3 operating during the method of FIG. 4.

FIG. 9C is a schematic view illustrating an embodiment of the data transformation/processing system of FIG. 8 operating during the method of FIG. 4.

FIG. 11B is a schematic view illustrating an embodiment of the data transformation/processing system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
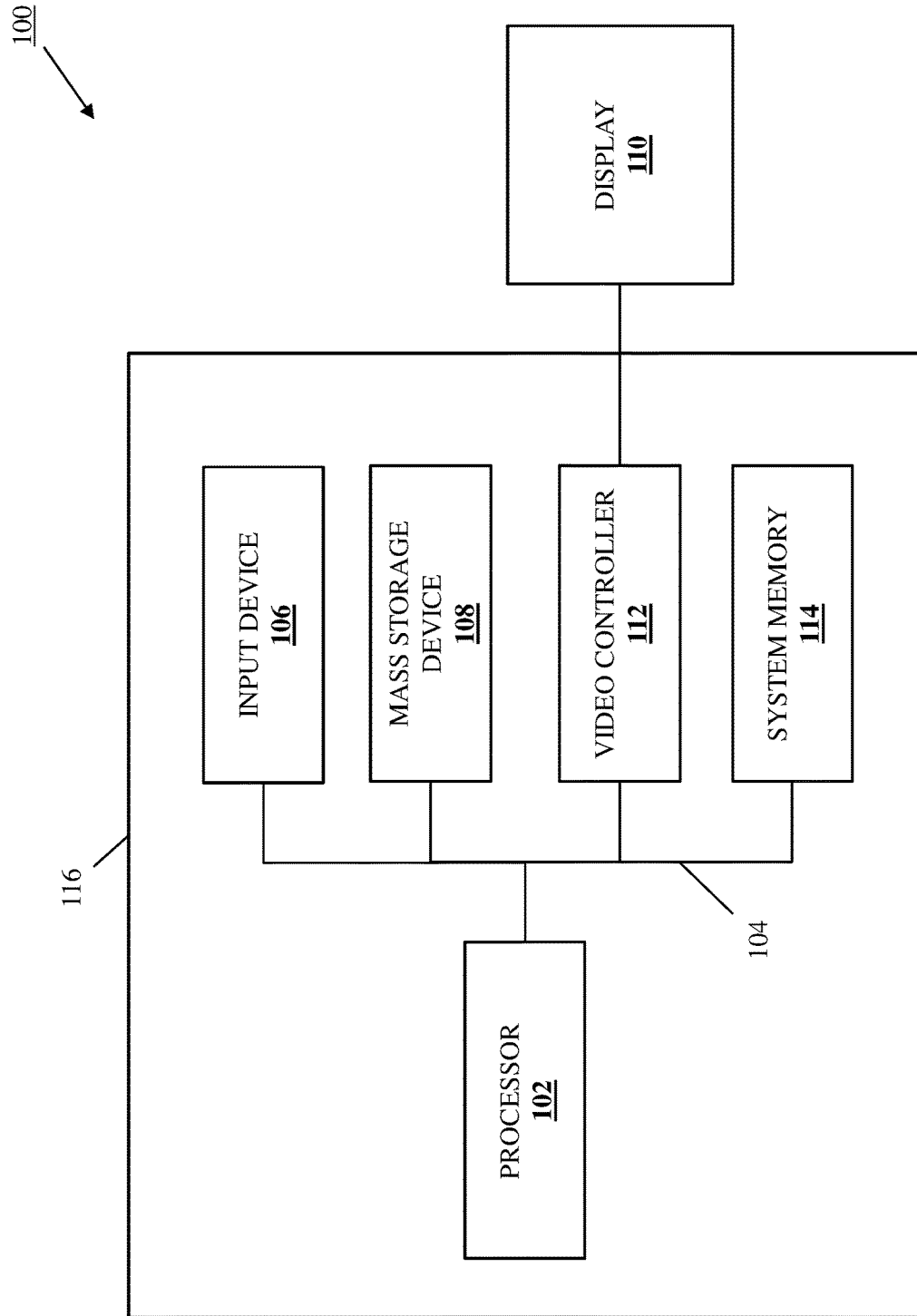
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
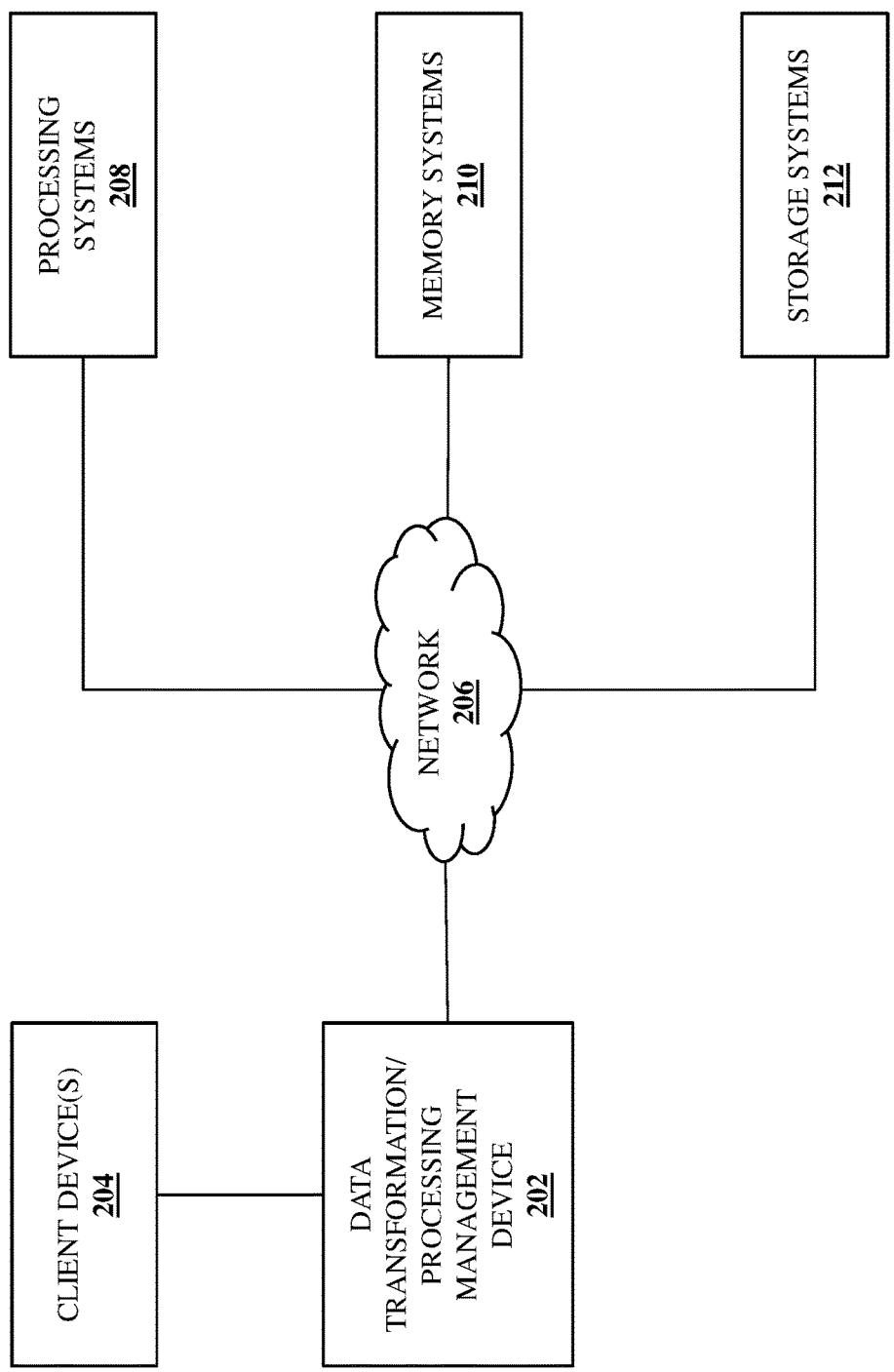
FIG. 2 is a schematic view illustrating an embodiment of data transformation/processing system that may be provided according to the teachings of the present disclosure.

Referring now to FIG. 2, an embodiment of a data transformation/processing system 200 is illustrated that may be provided according to the teachings of the present disclosure. In the illustrated embodiment, the data transformation/processing system 200 includes a data transformation/processing management device 202 that may operate to perform the data transformation/processing management functionality described below. In an embodiment, the data transformation/processing management device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data transformation/processing management devices provided in the data transformation/processing system 200 may include any devices that may be configured to operate similarly as the data transformation/processing management device 202 discussed below.

In the illustrated embodiment, the data transformation/processing system 200 includes one or more client devices 204 that are coupled to the data transformation/processing management device 202, and while the client device(s) 204 are illustrated as being directly coupled to the data transformation/processing management device 202, one of skill in the art in possession of the present disclosure will appreciate how the client device(s) 204 may be coupled to the data transformation/processing management device 202 via a network (e.g., a Local Area Network (LAN), the Internet, combinations thereof, and/or other networks known in the art) while remaining within the scope of the present disclosure as well. In an embodiment, the client device(s) 204 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that one of skill in the art in possession of the present disclosure would appreciate are configured to request the performance of the workloads discussed below. However, while illustrated and discussed as being provided by particular computing devices, one of skill in the art in possession of the present disclosure will recognize that client devices provided in the data transformation/processing system 200 may include any devices that may be configured to operate similarly as the client device(s) 204 discussed below.

In the illustrated embodiment, the data transformation/processing management device 202 is coupled to a network 206 that, in the examples below, includes a processing fabric, a memory fabric, and storage fabric, and that may be provided using a LAN, the Internet, combinations thereof, and/or any of a variety of networks that one of skill in the art in possession of the present disclosure will recognize as allowing the functionality described below. As such, the data transformation/processing management device 202 is coupled via the network 206 to a processing fabric that, in the examples illustrated and discussed below, is provided by a plurality of processing systems 208 that may be included in server devices or other computing systems known in the art. As described below, the processing systems 208 that provide the processing fabric may be provided by different types of processing systems that may include Central Processing Unit (CPU) processing systems, Graphics Processing Unit (GPU) processing systems, Field Programmable Gate Array (FPGA) processing systems, Data Processing Unit (DPU) processing systems, Network Interface Controller (NIC) processing systems or other packet processors, Application Specific Integrated Circuit (ASIC) processing systems, Processing-In-Memory (PIM) processing systems, other hardware accelerator processing systems (e.g., Regular Expression (ReGex) processing systems), and/or other types of processing systems that would be apparent to one of skill in the art in possession of the present disclosure would appreciate may be utilized to perform workloads.

The data transformation/processing management device 202 is also coupled via the network 206 to a memory fabric that, in the examples illustrated and discussed below, is provided by a plurality of memory systems 210 that may be included in server devices or other computing systems known in the art. As described below, the memory systems 210 that provide the memory fabric may be provided by different types of memory systems that may include CPU-accessible memory systems, GPU-accessible memory systems, FPGA-accessible memory systems, DPU-accessible memory systems, NIC-accessible memory systems or other packet-processor-accessible memory systems, ASIC-accessible memory systems, PIM memory systems, computational memory systems, other hardware-accelerator-accessible memory systems, and/or other types of memory systems that would be apparent to one of skill in the art in possession of the present disclosure would appreciate may be utilized by processing systems to perform workloads. In a specific example, the memory systems 210 may be configured to provide a shared memory fabric for the processing systems 208 such that each memory system 210 appears as a "local" memory system to each of the processing systems 208, with memory system access enabled via Remote Direct Memory Access (RDMA) operations and/or other memory system access techniques that would be apparent to one of skill in the art in possession of the present disclosure.

In an embodiment, any of the memory systems 210 may be "proximate" to any of the processing systems 208 based on, for example, the processing of data stored in that memory system by its proximate processing system being relatively more efficient than the processing of that data stored in that memory system by the other processing systems due to, for example, that proximity resulting in relatively faster access to that data that in turn allows relatively faster processing of that data and/or faster transfers of that data over a network (e.g., with a time needed to access data measured in terms of the time required to receive the first byte of data, the last byte of data, and/or using other data access time measurement techniques that one of skill in the art in possession of the present disclosure would recognize as taking into account data access delays cause by the number of network segments traversed, network bandwidth, network physical media, network protocols, network contention, network reliability, and/or other data access delays known in the art), and/or based on any other memory system/processing system proximity factors that would be apparent to one of skill in the art in possession of the present disclosure.

In a specific example, "proximity" between a memory system and a processing system may be defined in terms of network latency that may be measured based on "hops", network fabric type, and/or using other latency metrics that would be apparent to one of skill in the art in possession of the present disclosure. For example, the number of hops in a topology between a memory system and a processing system may be limited to a threshold number of hops in order to be "proximate". In another example, "proximity" maybe defined by the enablement of relatively higher performance networking between a memory system and a processing system, with the memory system or other "data landing zone" transformed in some embodiments into a memory space to enable memory-to-memory data transfers for peer-to-peer communications (while eliminating an external network).

The data transformation/processing management device 202 is also coupled via the network 206 to a storage fabric that, in the examples illustrated and discussed below, is provided by a plurality of storage systems 212. As described below, the storage systems 212 that provide the storage fabric may be provided by different types of storage systems that may include CPU-accessible storage systems, GPU-accessible storage systems, FPGA-accessible storage systems, DPU-accessible storage systems, NIC-accessible storage systems or other packet-processor-accessible storage systems, ASIC-accessible storage systems, other hardware-accelerator-accessible storage systems, and/or other types of storage systems that would be apparent to one of skill in the art in possession of the present disclosure would appreciate may be utilized by processing systems to perform workloads. However, while a specific data transformation/processing system 200 has been illustrated and described, one of skill in the art in possession of the present disclosure will appreciate how the data transformation/processing system of the present disclosure may include a variety of components and/or component configurations while remaining within the scope of the present disclosure as well.

Figure 3:
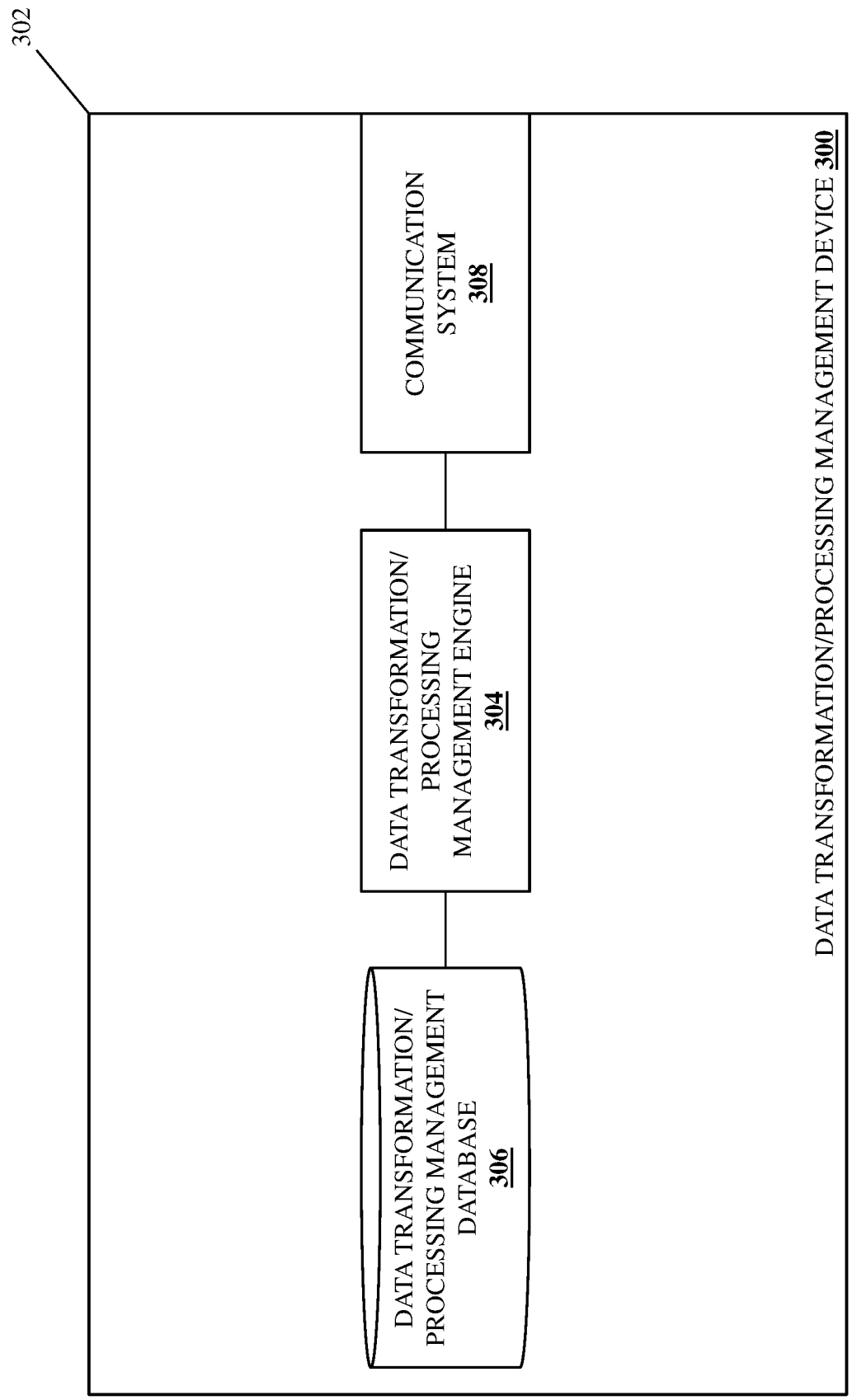
FIG. 3 is a schematic view illustrating an embodiment of a data transformation/processing management device that may be included in the data transformation/processing system of FIG. 2.

Referring now to FIG. 3, an embodiment of a data transformation/processing management device 300 is illustrated that may provide the data transformation/processing management device 202 discussed above with reference to FIG. 2. As such, the data transformation/processing management device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the data transformation/processing management device 300 discussed below may be provided by other devices that are configured to operate similarly as the data transformation/processing management device 300 discussed below. In the illustrated embodiment, the data transformation/processing management device 300 includes a chassis 302 that houses the components of the data transformation/processing management device 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data transformation/processing management engine 304 that is configured to perform the functionality of the data transformation/processing management engines and/or data transformation/processing management devices discussed below.

The chassis 302 may also house a storage system (not illustrated, but which may include the storage 108 discussed above with reference to FIG. 1) that is coupled to the data transformation/processing management engine 304 (e.g., via a coupling between the storage system and the processing system) and that includes a data transformation/processing management database 306 that is configured to store any of the information utilized by the data transformation/processing management engine 304 discussed below. The chassis 302 may also house a communication system 308 that is coupled to the data transformation/processing management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific data transformation/processing management device 300 has been illustrated, one of skill in the art in possession of the present disclosure will recognize that data transformation/processing management devices (or other devices operating according to the teachings of the present disclosure in a manner similar to that described below for the data transformation/processing management device 300) may include a variety of components and/or component configurations for providing conventional data processing management device functionality, as well as the functionality discussed below, while remaining within the scope of the present disclosure as well.

Figure 4:
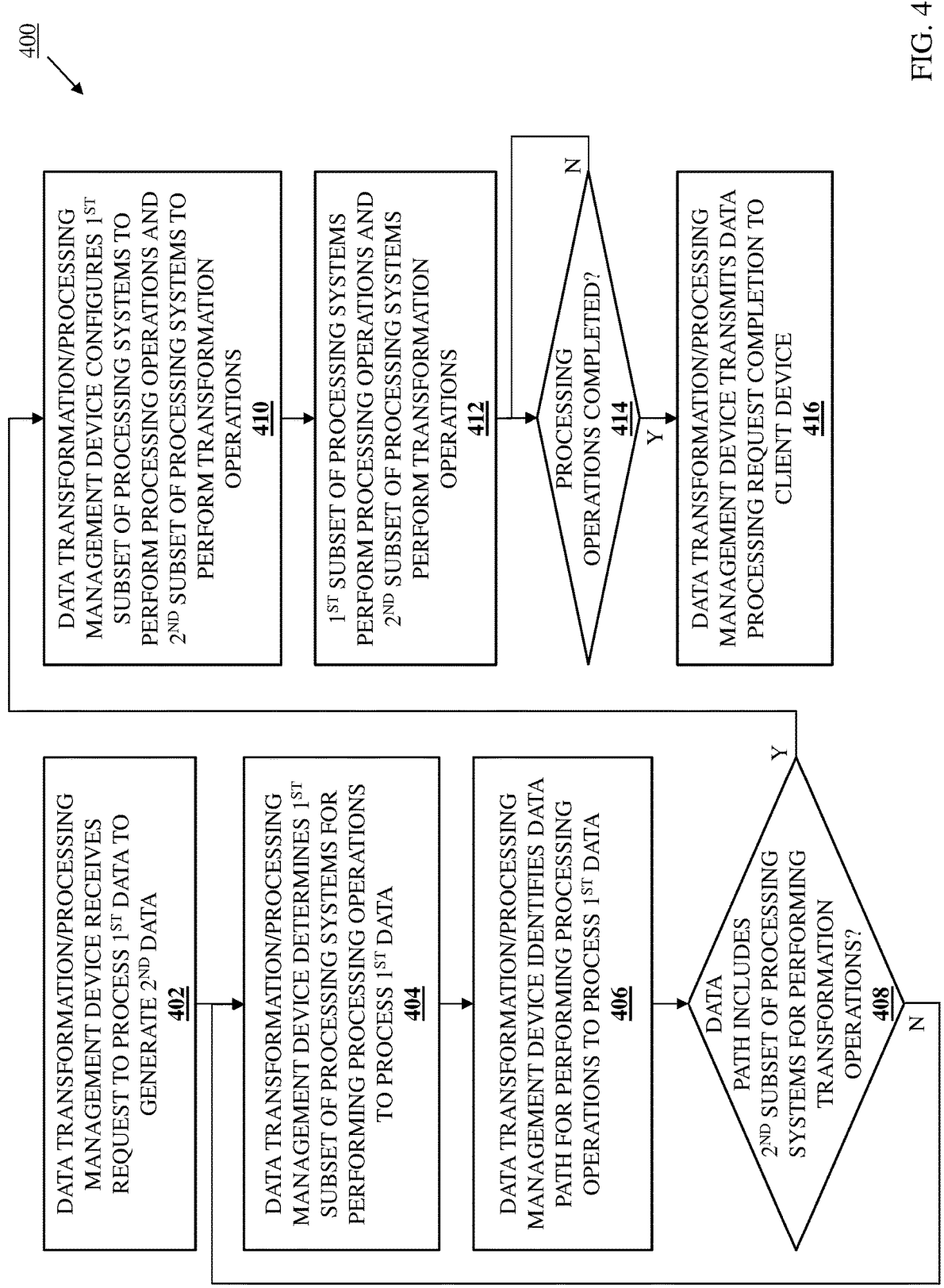
FIG. 4 is a flow chart illustrating an embodiment of a method for transforming and processing data.

Referring now to FIG. 4, an embodiment of a method 400 for transforming and processing data is illustrated. As discussed below, the systems and methods of the present disclosure provide for the transformation of data as it moves along a data path in order to enable efficient processing and persistent storage of that data. For example, the data transformation/processing system of the present disclosure may include a data transformation/processing management device coupled to a client device, processing systems, memory systems, and storage systems. The data transformation/processing management device receives a request from the client device to process first data to generate second data, determines a first subset of the processing systems for performing processing operations to process the first data, and identifies a data path for the processing operations that includes storage locations provided by subsets of the memory systems and the storage systems. The data transformation/processing management device then determines a second subset of the processing systems in the data path for performing transformation operations to transform the first data for processing and storage in the storage locations, and configures the first subset of the processing systems to perform the processing operations and the second subset of the processing systems to perform the transformation operations. As such, requests from client devices to process data may be satisfied in an efficient manner by optimizing the processing and storage of that data along a data path via which it is processed.

As discussed above, conventional data processing may be performed on data stored in a storage system (e.g., a block storage system, a file storage system, etc.), and may utilize a CPU and memory in a server device, while in some cases having the CPU orchestrate the offloading of processing operations using other processing systems (e.g., the GPU discussed above). However, as data processing evolves to a distributed computing paradigm providing a plurality of different types of processing systems (also referred to as "silicon diversity"), the inventors of the present disclosure have recognized that data processing operations may be optimized by leveraging the available silicon diversity by performing each of the processing operation(s) required to process the data using the most optimal processing system for performing that processing operation.

Furthermore, the inventors of the present disclosure have also recognized that each processing system that performs a processing operation required to process data may benefit from having the data it processes provided in a data format that results in the most efficient processing, with some data formats that provide for the most efficient processing operations provided according to industry standards, and other data formats that provide for the most efficient processing operations being proprietary to the processing systems that perform those processing operations. To provide some specific examples, CPU processing systems may most efficiently process in-memory data provided in a data format defined by the APACHE ARROW® language-agnostic software framework, GPU processing systems may most efficiently process data provided in data formats that store feature vectors in a memory region with byte alignment, FPGA processing systems may most efficiently process data provided in data formats based on an offload function, ReGex processing systems (e.g., ReGex offload engines) may most efficiently process data provided in payload data formats, and PIM processing systems (e.g., embedded compute engines) may most efficiently process data provided in data formats designed for PIM. Furthermore, some data formats may provide for the most efficient storage of data in a storage system (e.g., open data formats such as the APACHE PARQUET® data format, the APACHE OPTIMIZED ROW COLUMNAR (ORC)® columnar optimized data format for structured data, the APACHE AVRO® row optimized data format, etc.) However, while specific examples of processing-efficient and storage-efficient data formats are described herein, one of skill in the art in possession of the present disclosure will appreciate how a variety of data formats will fall within the scope of the present disclosure as well.

As such, distributed computing paradigms providing a plurality of different types of processing systems will benefit from the data transformation/processing architecture of the present disclosure that may transform data to optimal data formats for processing operations prior to those processing operations in a distributed processing fabric, and that may transform data to optimal data formats for storage prior to storing that data. However, while the systems and methods of the present disclosure are described as being provided using the distributed computing paradigms discussed above, one of skill in the art in possession of the present disclosure will appreciate how the techniques described herein may be implemented in a variety of other manners (e.g., other than distributed computing paradigms) while remaining within the scope of the present disclosure as well.

Figure 5A:
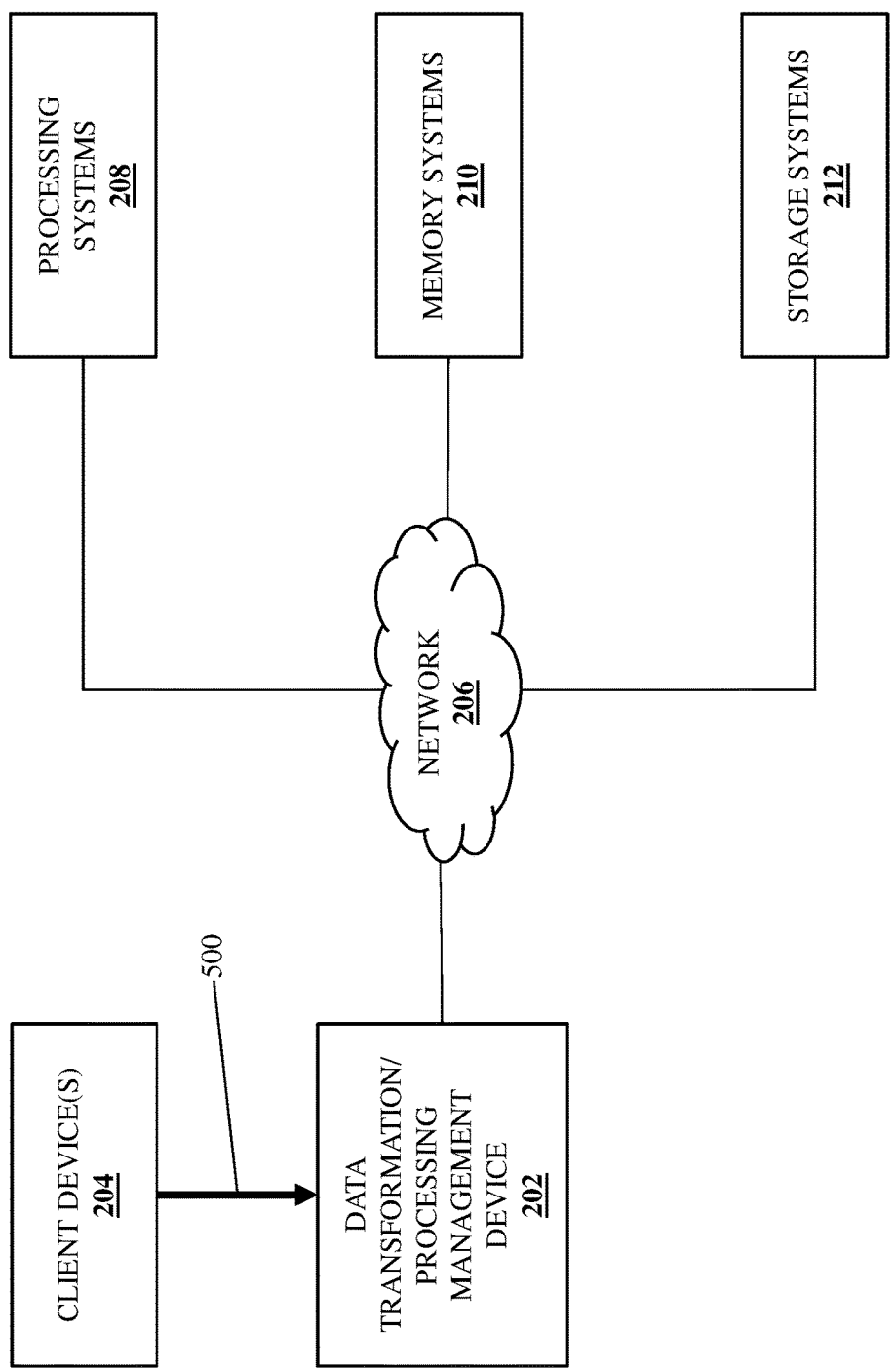
FIG. 5A is a schematic view illustrating an embodiment of the data transformation/processing system of FIG. 2 operating during the method of FIG. 4.
Figure 5B:
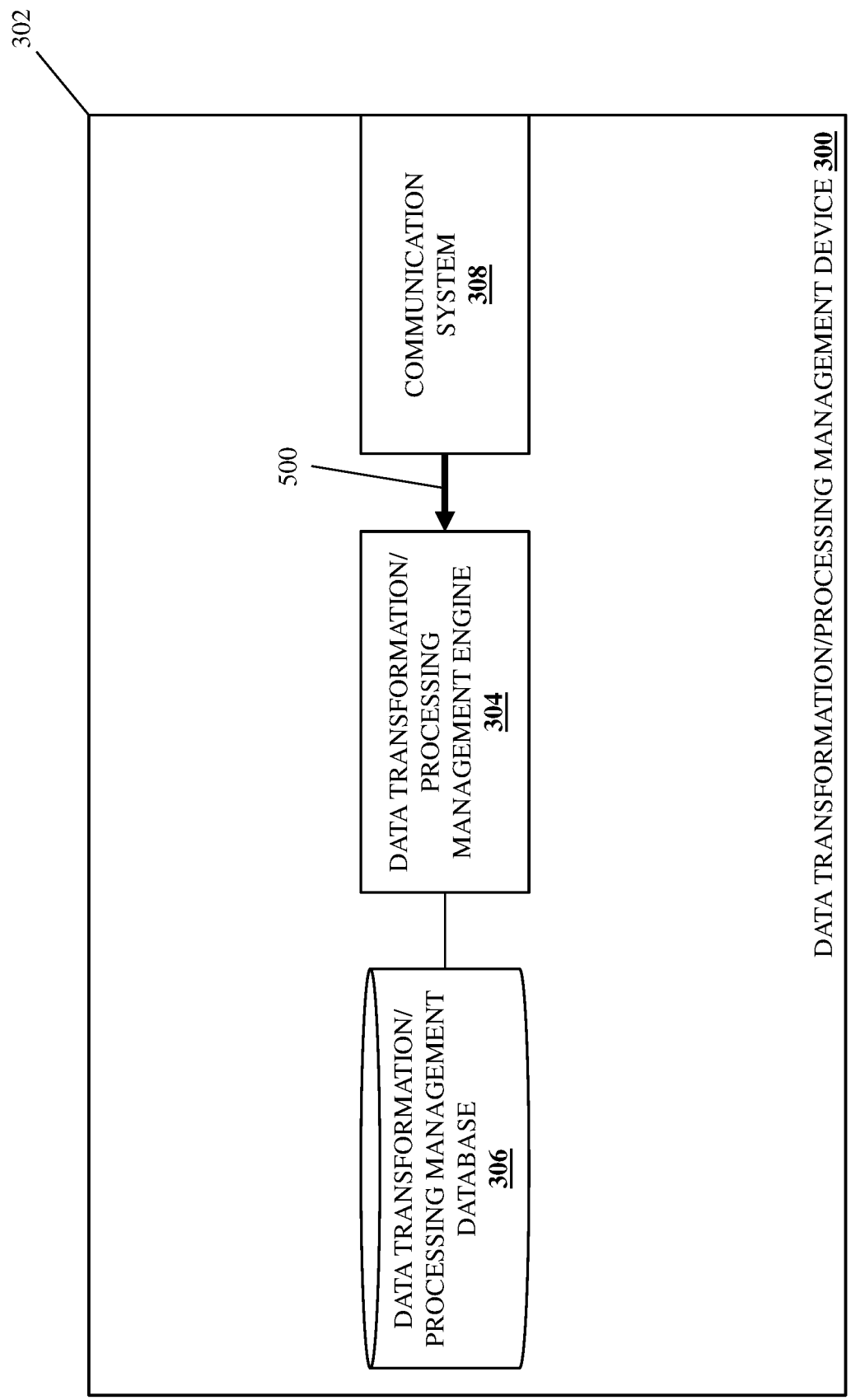
FIG. 5B is a schematic view illustrating an embodiment of the data transformation/processing management device of FIG. 3 operating during the method of FIG. 4.

The method 400 begins at block 402 where a data transformation/processing management device receives a request to process first data to generate second data. With reference to FIGS. 5A and 5B, in an embodiment of block 402, the client device(s) 204 may perform data processing request transmission operations 500 that may include transmitting a request to process data to the data transformation/processing management device 202/300 such that the data transformation/processing management engine 304 receives that request via its communication system 308. In the embodiments described below, the request to process data includes a request to perform processing on a dataset stored in one of the storage subsystems 212, and thus may be provided by a Structured Query Language (SQL) query, a request to run an Artificial Intelligence (AI) model, a data transformation request (e.g., a video transcoding request), and/or other dataset processing request directed to the processing of data in a particular dataset. Thus, in such embodiments, the request to process data may identify a first location that is included in a first subset of the storage systems 212 from which to retrieve "source" data (e.g. the first data discussed above), one or more processing operations to perform on that source data in order to generate "destination" data (e.g., the second data discussed above), and a second location that is included in the first subset of the storage systems 212 in which to store the destination data.

However, while the request to process data is described above as identifying the location of "source" data, one of skill in the art in possession of the present disclosure will appreciate how the data upon which the processing is performed as discussed below may be provided in the request to process data, and/or provided or identified in other manners that will fall within the scope of the present disclosure as well. Furthermore, while the processing operations to perform are described as being included in the request to process data, one of skill in the art in possession of the present disclosure will appreciate how the processing operations required to perform the processing requested at block 402 may be identified by the data transformation/processing management engine 304 in response to receiving the request to process the data (e.g., in a database of processing operations associated with corresponding data processing requests). As such, while a few specific examples of the request to process data have been provided above, one of skill in the art in possession of the present disclosure will appreciate how the processing of the data described below may be requested in a variety of manners that will fall within the scope of the present disclosure as well.

Figure 6B:
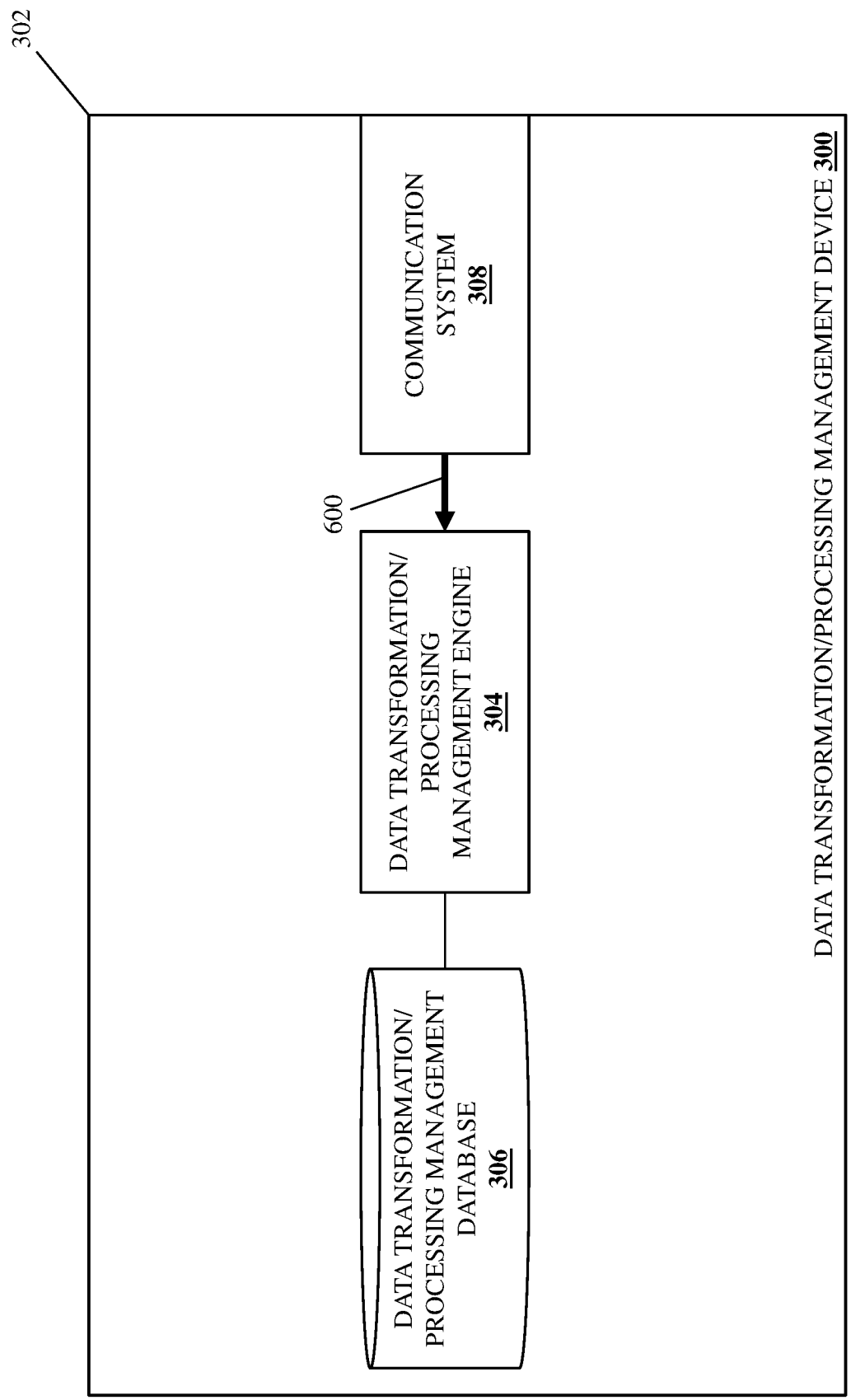
FIG. 6B is a schematic view illustrating an embodiment of the data transformation/processing management device of FIG. 3 operating during the method of FIG. 4.

The method 400 then proceeds to block 404 where the data transformation/processing management device determines a first subset of processing systems for performing processing operations to process the first data. In an embodiment, at block 404, the data transformation/processing management engine 304 in the data transformation/processing management device 202/300 may perform a variety of operations to determine a first subset of the processing systems 208 for performing the processing operations that provide for the processing of the data requested at block 402. For example, with reference to FIGS. 6A and 6B, the data transformation/processing management engine 304 may perform resource utilization identification operations 600 that may include identifying, via its communication system 308 and through the network 206, the utilization of the processing systems 208, the memory systems 210, and/or the storage systems 212. As will be appreciated by one of skill in the art in possession of the present disclosure, the resource utilization identified at block 404 may include any resource utilization characteristics (e.g., processing/memory/storage bandwidth, processing/memory/storage latency, etc.).

In another example, with reference to FIG. 6C, the data transformation/processing management engine 304 in the data transformation/processing management device 202/300 may perform data transformation/processing management database access operations 602 that may include accessing information stored in the data transformation/processing management database 306 to determine the first subset of the processing systems 208 for performing the processing operations that provide for the processing of the data requested at block 402. For example, the data transformation/processing management database 306 may store a resource topology map that identifies the topology of the processing fabric that includes the processing systems 208, the memory fabric that includes the memory systems 210, and/or the storage fabric that includes the storage systems 210. As such, one of skill in the art in possession of the present disclosure will appreciate how the resource topology map may identify the relative proximities of the processing systems 208 and each of the memory systems 210 and the storage systems 212. Furthermore, the data transformation/processing management database 306 may also identify the processing operation capabilities of the processing systems 208, the transformation operation capabilities of the processing systems 208, and/or any other details of the processing systems 208 that one of skill in the art in possession of the present disclosure would recognize as being utilized to perform any of the functionality discussed below.

As such, in a specific example of block 404, the data transformation/processing management engine 304 in the data transformation/processing management device 202/300 may determine the processing systems 208 that are capable of performing the processing operations required to perform the processing on the data requested at block 402 (e.g., the "processing-capable processing systems"). As will be appreciated by one of skill in the art in possession of the present disclosure, when more than one of the processing-capable processing systems is determined, those processing-capable processing systems may be provided by different types of processing systems, one or more of which may perform the associated processing operations more optimally and/or efficiently than the others of the processing-capable processing systems. As such, in some embodiments, the determination of the processing-capable processing systems may include the determination of "optimal processing-capable processing systems" that are capable of performing the associated processing operations more optimally or efficiently than the other processing-capable processing systems.

Continuing with this specific example, the data transformation/processing management engine 304 may then use the resource utilization of the processing-capable processing systems to determine which of those processing systems are available to perform the processing on the data requested at block 402 (e.g., the "available processing-capable processing systems"). As will be appreciated by one of skill in the art in possession of the present disclosure, availability thresholds may be defined (e.g., a minimum capacity required for a processing system to be considered available in any situation, a minimum capacity required for a processing system to be considered available for a particular processing operation, etc.), and the resource utilization of the processing-capable processing systems may be used to determine which of those processing-capable processing systems are available processing-capable processing systems.

Continuing with this specific example, the data transformation/processing management engine 304 may then determine the available processing-capable processing systems that are proximate the storage system(s) from which the source data will be retrieved and in which the destination data will be stored (e.g., the "proximate, available processing-capable processing systems"). As such, following block 404, the data transformation/processing management engine 304 may have determined a "first" subset of the processing systems 208 for performing each of the processing operations required for the processing of the data requested at block 402, with that first subset of processing systems 208 provided by processing systems with relative combinations of proximity, utilization/availability, and capability that result in the processing of the data requested at block 402 in a relatively more efficient manner than other subsets of the processing systems that may be available to perform that processing. However, while a specific example has been provided, one of skill in the art in possession of the present disclosure will appreciate how the determination of processing systems to perform the processing of data may be based on any of a variety of factors that will fall within the scope of the present disclosure as well.

The method 400 then proceeds to block 406 where the data transformation/processing management device identifies a data path for performing the processing operations to process the first data. In an embodiment, at block 406, the data transformation/processing management engine 304 in the data transformation/processing management device 202/300 may identify a data path for performing the processing operations by the first subset of the processing systems 208 that includes storage locations provided by a first subset of the memory systems 210 and a first subset of the storage systems 212. As will be appreciated by one of skill in the art in possession of the present disclosure, each processing system that will perform the processing operations may utilize a respective memory system for storing the data upon which that processing operation will be performed, and thus the determining of the available processing-capable processing systems and the proximate, available processing-capable processing systems also identifies corresponding "available" memory systems that define a data path for performing the processing operations.

As such, at block 406, the data transformation/processing management engine 304 will identify a data path that includes the storage location of the source data in the storage systems 212, the storage location in the storage systems 212 in which the destination data will be stored, and the storage locations in the available memory systems in which data may be stored as part of the processing by the first subset of the processing systems 208 determined at block 404. As discussed above, in some embodiments, the "initial" data path identified during an "initial" performance of block 406 (as opposed to any "subsequent" performances of block 406 according to decision block 408, discussed below) may be a "processing-system-optimized" data path that provides for the performance of the processing operations on the data by the most optimal processing systems as determined based on the resource topology map, resource utilization, resource capabilities, location of the source data, location at which the destination data will be stored, and/or any other factors that one of skill in the art in possession of the present disclosure would recognize as provided for the determination of a data path that is optimized for the processing operations discussed above.

The method 400 then proceeds to decision block 408 where it is determined whether the data path includes a second subset of processing systems for performing transformation operations. In an embodiment, the data transformation/processing management database access operations 602 discussed above may include accessing information stored in the data transformation/processing management database 306 to determine transformation operations for the processing operations that provide for the processing of the data requested at block 402. For example, the data transformation/processing management database 306 may store data processing and data storage characteristic information that identifies the characteristics of the data utilized in and/or generated by the processing operations that will be performed by the first subset of the processing systems 208 discussed above. In the specific examples provided below, the data processing and data storage characteristic information identifies the data format for the data that provides for the most efficient or otherwise optimized processing of that data for each processing operation and/or the most efficient or otherwise optimized storage of that data following each processing operation, but one of skill in the art in possession of the present disclosure will appreciate how data processing and data storage characteristic information other than optimized data formats will fall within the scope of the present disclosure as well.

As such, at decision block 408, the data transformation/processing management engine 304 in the data transformation/processing management device 202/300 may determine, for each of the processing operations that will be performed by the first subset of processing systems 208 that provide the data path identified at block 406, a respective data format that allows that processing operation to be performed most efficiently and/or optimally, and/or allows data generated by that processing operation to be stored most efficiently and/or optimally. Continuing with the specific examples provided above, the data transformation/processing management engine 304 may determine that in-memory data should be provided in a data format defined by the APACHE ARROW® language-agnostic software framework for processing by a CPU processing system in the data path, that data should be provided in a data format that stores feature vectors in a memory region with byte alignment for processing by a GPU processing system in the data path, that data should be provided in a data format based on an offload function for processing by an FPGA processing system in the data path, that data should be provided in a payload data format for processing by a ReGex processing system (e.g., a ReGex offload engine) in the data path, or that data should be provided in a data format designed for PIM for processing by a PIM processing system (e.g., an embedded compute engine) in the data path.

Furthermore, the data transformation/processing management engine 304 may determine that destination data generated via the processing operations provided via the data path should be provided in a data format such as the APACHE PARQUET® data format, the APACHE OPTIMIZED ROW COLUMNAR (ORC)® columnar optimized data format, or the APACHE AVRO® row optimized data format for storage in the storage system 212. However, while specific examples of data formats for different processing systems/processing operations and/or for storage have been described, one of skill in the art in possession of the present disclosure will appreciate how a variety of data formats will fall within the scope of the present disclosure as well.

As will be appreciated by one of skill in the art in possession of the present disclosure, the source data may be stored in the first subset of the storage systems 212 in a "source" data format that provides for the most efficient and/or optimized storage of the source date in the first subset of the storage systems 212, and that each data format determined for the respective processing operations discussed above may require a corresponding transformation operation to transform the data to that data format. As such, the source data may require a first processing transformation operation to transform that source data to a first intermediate processing data format that provides for the most efficient and/or optimized performance of a first processing operation by a first processing system in the data path that generates first intermediate data. Furthermore, that first intermediate data may require a second processing transformation operation to transform that first intermediate data to a second intermediate processing data format that provides for the most efficient and/or optimized performance of a second processing operation by a second processing system in the data path that generates second intermediate data, and similar processing transformation operations may be required until a final processing transformation operation transforms final intermediate data to a final intermediate processing data format that provides for the most efficient and/or optimized performance of a final processing operation by a final processing system in the data path that generates the destination data. Finally, that destination data may require a storage transformation operation to transform that destination data to a storage data format that provides for the most efficient and/or optimized storage of that destination data.

As such, at decision block 408, the data transformation/processing management engine 304 in the data transformation/processing management device 202/300 may identify each of the transformation operations required for the processing operations and storage discussed above, and then may determine a second subset of the processing systems for performing those transformation operations. As will be appreciated by one of skill in the art in possession of the present disclosure, the determination of the second subset of processing systems 208 for performing the transformation operations may be performed similarly as the determination of the first subset of processing systems 208 for performing the processing operations discussed above. Thus, the resource utilization identification operations 600 and the data transformation/processing management database access operations 602 may allow the data transformation/processing management engine 304 to determine the processing systems 208 that are capable of and available to perform the transformation operations determined as discussed above (as well as identifying a an optimal processing system to perform a transformation operation when multiple processing systems are capable of and available to do so in some situations).

Finally, at decision block 408, the data transformation/processing management engine 304 in the data transformation/processing management device 202/300 may determine whether the second subset of the processing system 308 determined above are included in the data path identified at block 406. As will be appreciated by one of skill in the art in possession of the present disclosure, for each of the transformation operations determined as discussed above, the data transformation/processing management engine 304 may determine whether the corresponding memory systems utilized by the processing systems 208 that are capable of and available to perform that transformation operation is included in the data path identified at block 406. As such, the data transformation/processing management engine 304 may determine whether a processing system/memory system combination exists in the data path for each transformation operation determined as discussed above that allows the data to be provided in the memory system in that processing system/memory system combination, transformed via the transformation operation performed by the processing system in that processing system/memory system combination, and then provided in the memory system of the processing system that will perform the next processing operation in the data path.

For example, in some embodiments, proximity thresholds may be defined between memory systems such that processing systems that utilize memory systems within the proximity threshold of memory systems used by the first subset of the processing systems 208 will be considered "included in the data path" while processing systems that utilize memory systems outside of the proximity threshold of memory systems used by the first subset of the processing systems 208 will be considered not "included in the data path". However, while a specific example of the determination of whether processing systems are included in a data path has been described, one of skill in the art in possession of the present disclosure will appreciate how other techniques for determining whether processing systems are included in a data path will fall within the scope of the present disclosure as well.

If, at decision block 408, it is determined that the data path does not include the second subset of processing systems for performing transformation operations, the method 400 returns to block 404. As such, if the data path identified during the initial performance of block 406 does not include the second subset of the processing systems 208 for performing the transformation operations determined as discussed above, the method 400 loop through blocks 404, 406, and 408 to determine a different first subset of the processing systems 208 for performing the processing operations to process the data as requested at block 402 that provides a different data path that includes the second subset of processing systems 208 for performing the transformation operations. Furthermore, while the method 400 illustrates and describes the determination of the first subset of processing systems 208 in the data path for performing the processing operations on the data, followed by the determination of whether that data path includes the processing systems for performing the transformation operations, along with the iterating of those method blocks until a first subset of the processing systems 208 in a data path is identified that includes processing system for performing the transformation operations, one of skill in the art in possession of the present disclosure will appreciate how the determination of the processing operations and transformation operations required to process the data may allow for the identification of a data path that includes both the first subset of the processing systems 208 for performing the processing operations and the second subset of the processing systems 208 for performing the transformation operations without the need for iterating the method blocks as discussed above while remaining within the scope of the present disclosure as well.

Figure 7A:
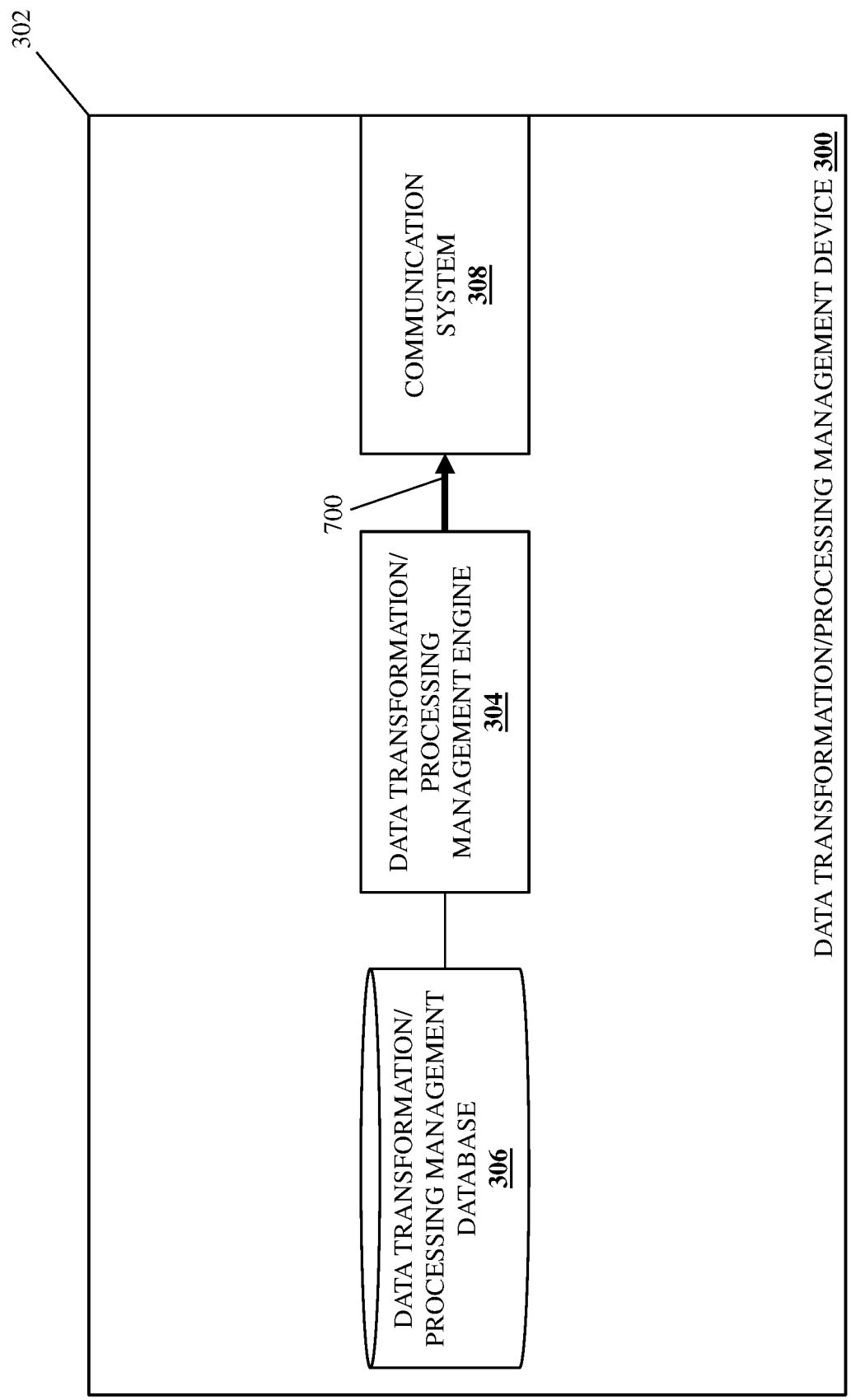
FIG. 7A is a schematic view illustrating an embodiment of the data transformation/processing management device of FIG. 3 operating during the method of FIG. 4.
Figure 7B:
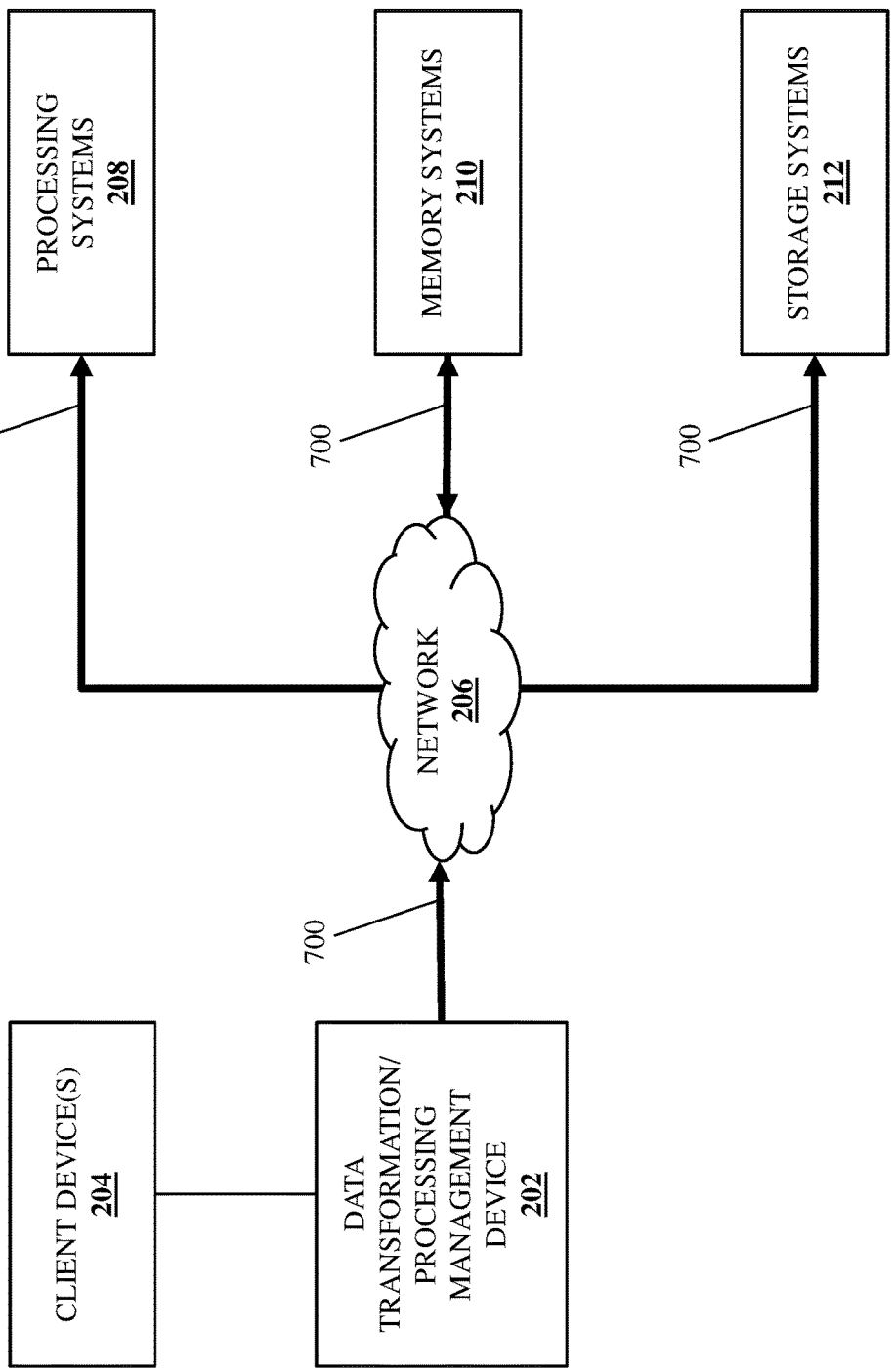
FIG. 7B is a schematic view illustrating an embodiment of the data transformation/processing system of FIG. 2 operating during the method of FIG. 4.

If, at decision block 408, it is determined that the data path includes the second subset of processing systems for performing transformation operations, the method 400 proceeds to block 410 where the data transformation/processing management device configures the first subset of processing systems to perform the processing operations and the second subset of processing systems to perform the transformation operations. With reference to FIGS. 7A and 7B, in an embodiment of block 410, the data transformation/processing management engine 304 in the data transformation/processing management device 202/300 may perform configuration operations 700 via its communication system 308a and through the network 206 in order to configure any of the processing systems 208, the memory systems 210, and/or the storage systems 212 in order to perform the operations and/or provide for the functionality discussed below.

As such, one of skill in the art in possession of the present disclosure will appreciate how the configuration operations 700 may include the transmission of any instructions, commands, and/or other information to configure the first subset of the processing systems 208 discussed above to perform the processing operations discussed above, to configure the second subset of the processing systems 208 discussed above to perform the transformation operations discussed above, as well as to configure the first subset of the memory systems 210 and the first subset of the storage systems 212 utilized by the first and second subsets of the processing systems 208 to allow for the performance of the processing operations and transformation operations. In a specific example, each of the first and second subsets of the processing systems 208 may have previously been configured to provide a Function-as-a-Service (FaaS) that performs the processing operation(s) or transformation operation(s) discussed above, and thus the configuration of the first and second subsets of the processing systems 208 may include configuring those processing systems to perform their corresponding FaaS in a manner that will provide the processing operation or transformation operation discussed above.

In some embodiments, the configuring the second subset of the plurality of processing systems to perform the transformation operations may include the configuration of the source data identified in the request to process the data received at block 402. For example, at block 410, the data transformation/processing management engine 304 in the data transformation/processing management device 202/300 may retrieve the source data from the storage system 818, and may "tag" the source data or otherwise provide respective transformation information in the source data for each of the transformation operations determined as discussed above, with the transformation information configured to cause each of the second subset of the plurality of processing systems to perform one of the transformation operations based on the respective transformation information provided in the source data for that transformation operation. To provide a specific example, any of the data format transformations discussed below may be performed by one of the second subset of the processing systems 208 via the identification of the respective transformation information provided in the data for the corresponding transformation operations that processing system is configured to perform, determining the data format included in that respective transformation information, and then transforming data to that data format as part of the data transformation operation.

Figure 8:
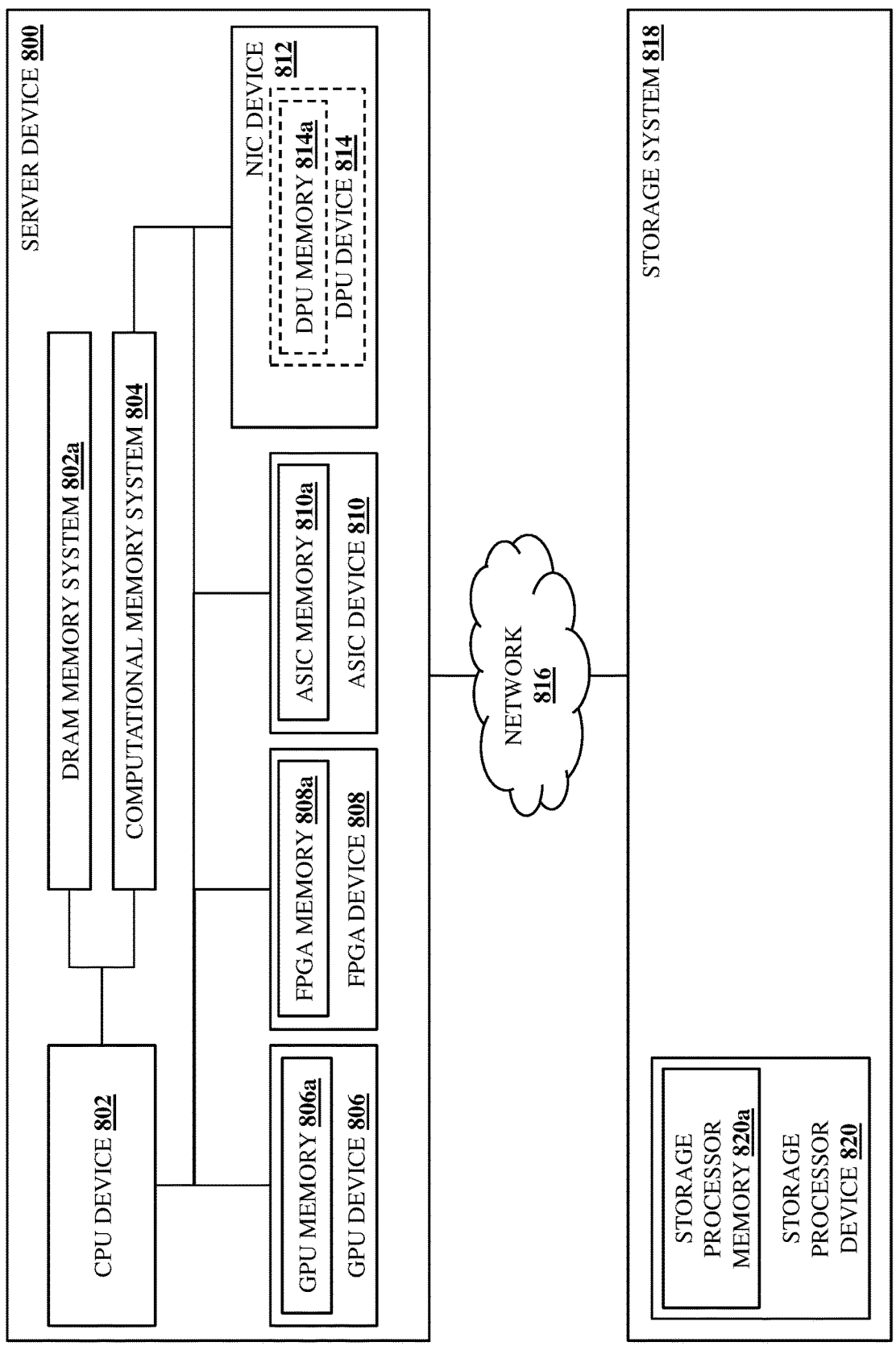
FIG. 8 is a schematic view illustrating an embodiment of a data transformation/processing system utilized during the method of FIG. 4.

With reference to FIG. 8, an embodiment of a data transformation/processing system is illustrated that one of skill in the art in possession of the present disclosure will recognize provides a simplified example of the data transformation/processing system 200 discussed above with reference to FIG. 2, and that is illustrated to discuss simplified examples of the performance of the method 400. As illustrated, a server device 800 may be provided that includes a CPU device 802 that is coupled to a Dynamic Random Access Memory (DRAM) memory system 802a that is utilized by the CPU device 802. A computational memory system 804 is coupled to the CPU device 802, and one of skill in the art in possession of the present disclosure will appreciate that, while not illustrated, the computational memory system 804 may include both a processor and memory for providing the functionality described below. A GPU device 806 is coupled to the CPU device 802, and may include a GPU memory 806a that is utilized by the GPU device 806. An FPGA device 808 is coupled to the CPU device 802, and may include an FPGA memory 808a that is utilized by the FPGA device 808. An ASIC device 810 is coupled to the CPU device 802, and may include an ASIC memory 810a that is utilized by the ASIC device 810. A NIC device 812 is coupled to the CPU device 802 and the computational memory system 804, and may include an optional DPU device 814 including a DPU memory 814a that is utilized by the DPU device 814. The server device 800 is coupled via a network 816 (e.g., the network 206 discussed above) to a storage system 818 that includes a storage processor device 820 having a storage processor memory 820a.

As will be appreciated by one of skill in the art in possession of the present disclosure, the CPU device 802, computational memory system 804, the GPU device 806, the FPGA device 808, the ASIC device 810, the DPU device 814, and the storage processor device 820 may provide the plurality of processing systems 208 in the data transformation/processing system 200; the DRAM memory system 802a, the computational memory system 804, the GPU memory 806a, the FPGA memory 808a, the ASIC memory 810a, the DPU memory 814a, and the storage processor memory 820a may provide the plurality of memory systems 210 in the data transformation/processing system 200, and the storage system 818 may provide the plurality of storage systems in the data transformation/processing system 200.

In the example below directed to FIGS. 9A, 9B, 9C, and 9D, the GPU device 806 in the server device 800 is configured according to the method 400 to perform a processing operation to process source data stored in the storage system 818, with the DPU device 814 in the server device 800 configured according to the method 400 to perform a first transformation operation on the source data retrieved from the storage system 818 to a data format that provides for efficient/optimal processing by the GPU device 806, as well as to perform a second transformation operation on the destination data generated by the GPU device 806 for storage in the storage system 818. In the example below directed to FIGS. 10A, 10B, 10C, and 10D, the computational memory system 804 in the server device 800 is configured according to the method 400 to perform a processing operation to process source data stored in the storage system 818, with the CPU device 802 in the server device 800 configured according to the method 400 to perform a first transformation operation on the source data retrieved from the storage system 818 to a data format that provides for efficient/optimal processing by the computational memory system 804, as well as to perform a second transformation operation on the destination data generated by the computational memory system 804 for storage in the storage system 818. However, one of skill in the art in possession of the present disclosure will appreciate how the single-processing-operation examples described below provide greatly simplified embodiments of the operation of the data transformation/processing system of the present disclosure, and how multiple processing operations may be performed on data according to the teachings of the present disclosure while remaining within its scope.

Figure 9A:
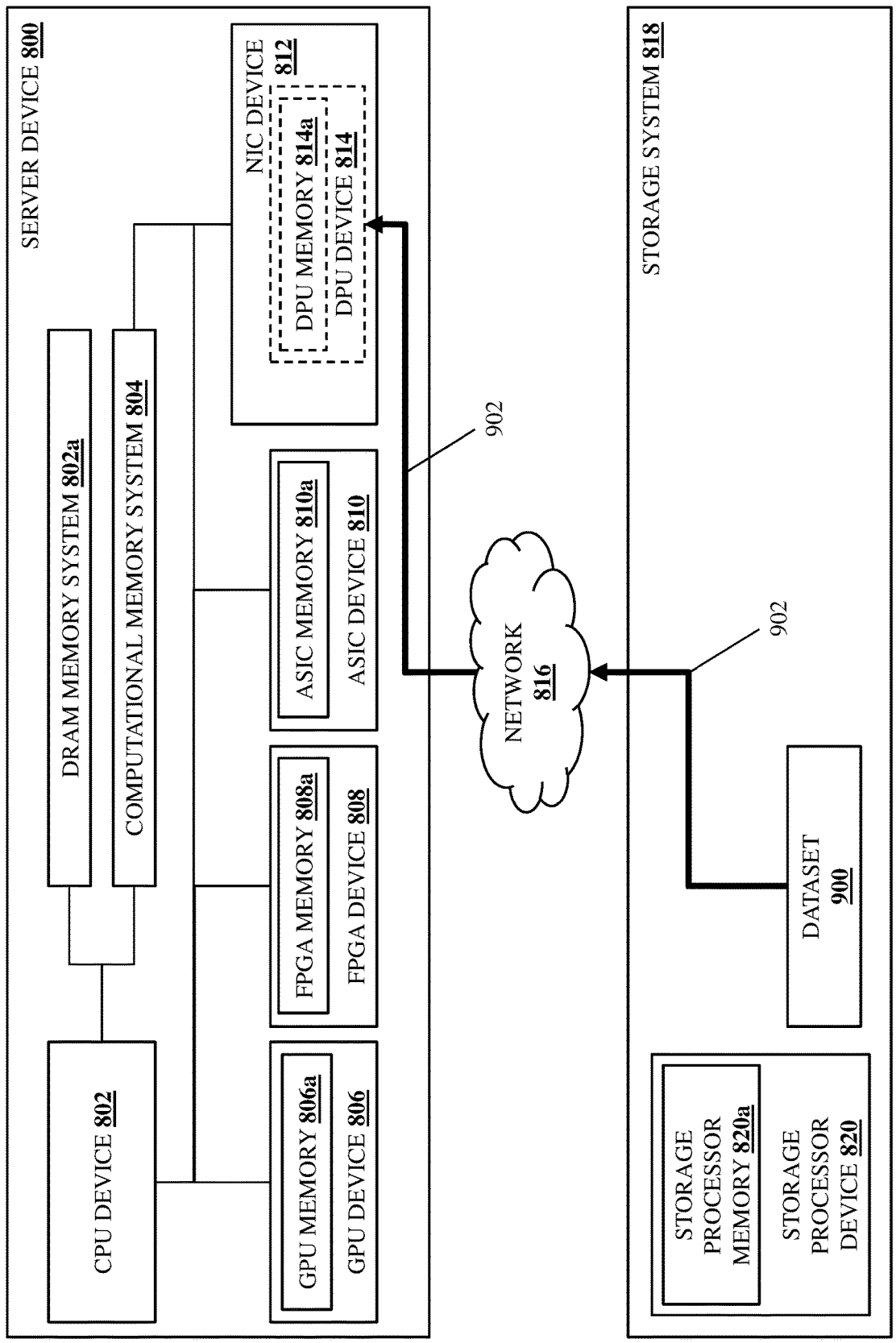
FIG. 9A is a schematic view illustrating an embodiment of the data transformation/processing system of FIG. 8 operating during the method of FIG. 4.
Figure 9B:
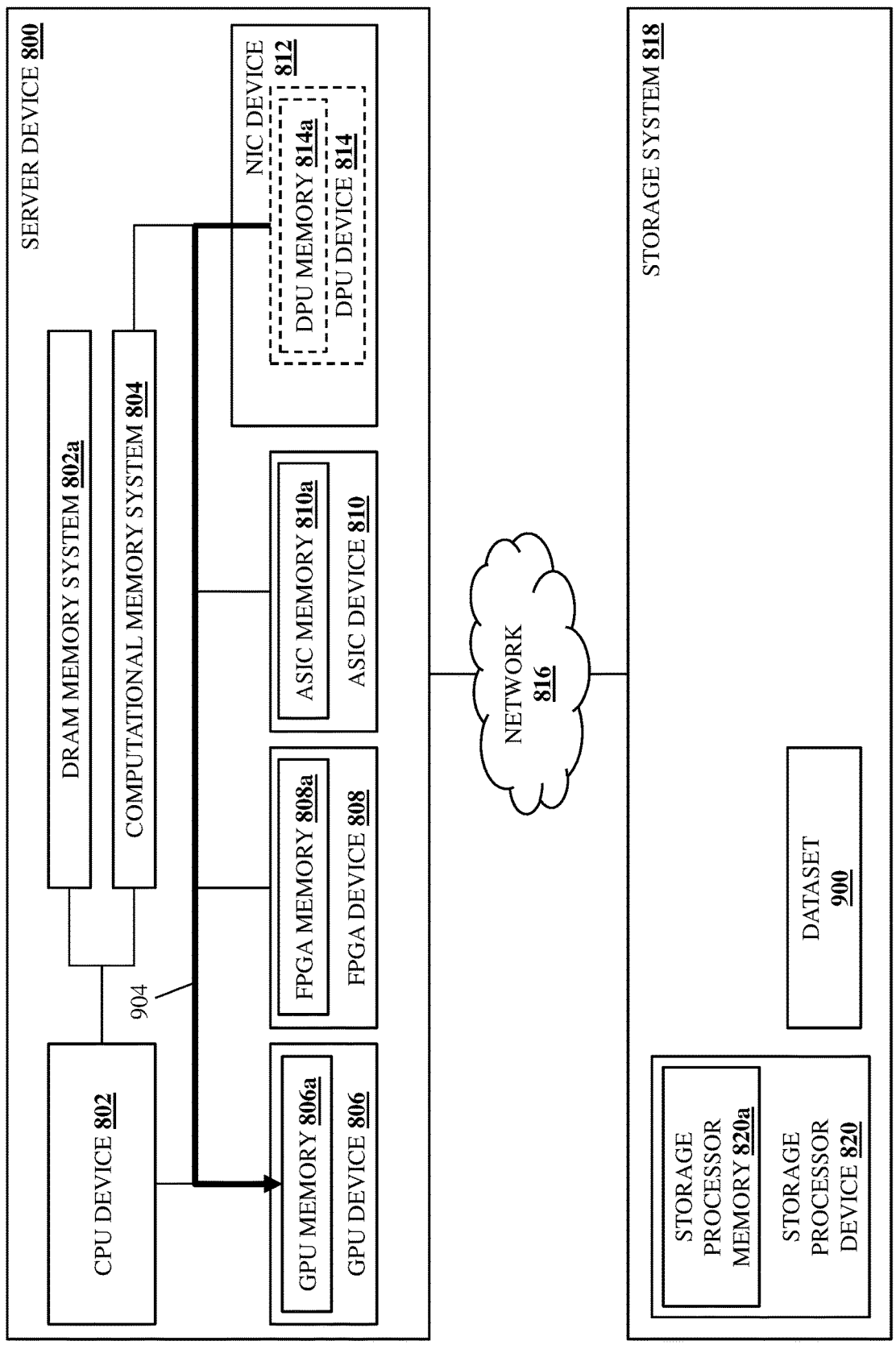
FIG. 9B is a schematic view illustrating an embodiment of the data transformation/processing system of FIG. 8 operating during the method of FIG. 4.

The method 400 then proceeds to block 412 where the first subset of processing systems perform the processing operations and the second subset of processing systems perform the transformation operations. With reference to the example illustrated in FIGS. 9A-9D, in an embodiment of block 412, the request to process data received at block 402 may have identified the source data included in a dataset 900 that is stored in the storage system 818. As illustrated in FIG. 9A and based on its configuration according to the method 400, the DPU device 814 may perform data retrieval operations 902 that include retrieving the source data having a source data format from the storage system 818 via the network 816 and storing that source data in the DPU memory 814a. Furthermore, based on its configuration according to the method 400, the DPU device 814 may then perform the first data transformation operations on the source data stored in the DPU memory 814*a* in order transform the source data format of that source data to a processing data format that provides for the most efficient/optimal processing operations by the GPU device 806. As illustrated in FIG. 9B and based on its configuration according to the method 400, the DPU device 814 may then perform data transfer operations 904 that include providing that source data for storage in the GPU memory 806*a*.

Further still, based on its configuration according to the method 400, the GPU device 806 may then perform the data processing operations (e.g., the GPU device 806 may run an Artificial Intelligence (AI) model) on the source data stored in the GPU memory 814*a* in order to generate destination data, and as discussed above, the processing data format of the source data provides for the most efficient/optimal processing operations by the GPU device 806 in generating the destination data. As will be appreciated by one of skill in the art in possession of the present disclosure, the destination data may include a "destination data format" that, in different examples, may be the same as the processing data format of the source data, may be different than the processing data format of the source data and may have been provided as part of the processing operations performed by the GPU device 806, and/or may include any of a variety of data formats that would be apparent to one of skill in the art in possession of the present disclosure.

Figure 9D:
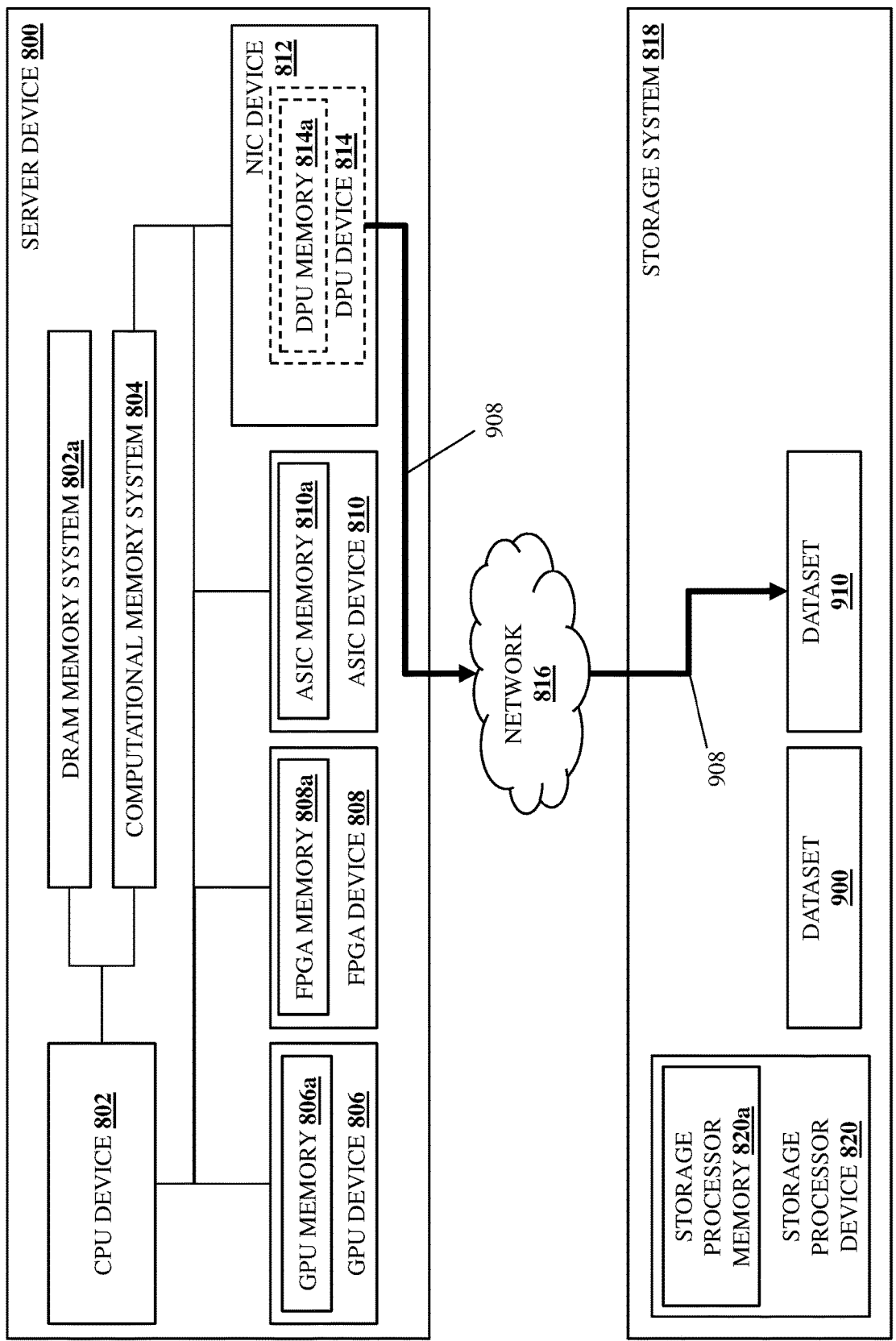
FIG. 9D is a schematic view illustrating an embodiment of the data transformation/processing system of FIG. 8 operating during the method of FIG. 4.

As illustrated in FIG. 9C and based on its configuration according to the method 400, the DPU device 814 may then perform data retrieval operations 906 that include retrieving the destination data from the GPU memory 806*a*, and storing the destination data in the DPU memory 814*a*. Furthermore, based on its configuration according to the method 400, the DPU device 814 may then perform second data transformation operations on the destination data stored in the DPU memory 814*a* in order transform the destination data format of that destination data to a storage data format (e.g., an APACHE PARQUET® data format) that provides for the most efficient/optimal storage of the destination data in the storage system 818. As illustrated in FIG. 9D, the DPU device 814 may then perform data storage operations 908 that include providing the destination data having the storage data format via the network 816 for storage in a dataset 910 in the storage system 818 that may have been identified in the request to process data received at block 402.

Figure 10A:
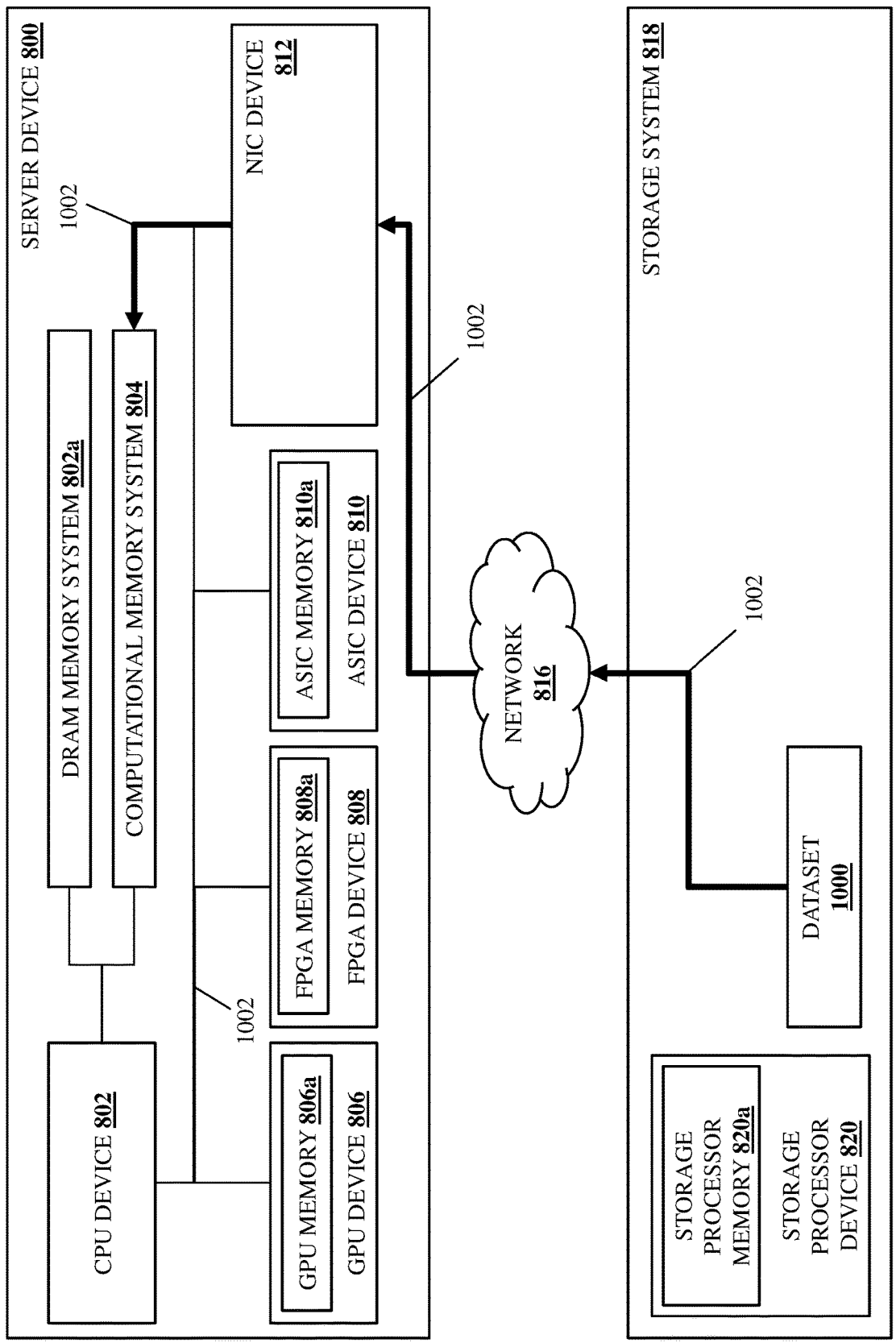
FIG. 10A is a schematic view illustrating an embodiment of the data transformation/processing system of FIG. 8 operating during the method of FIG. 4.
Figure 10B:
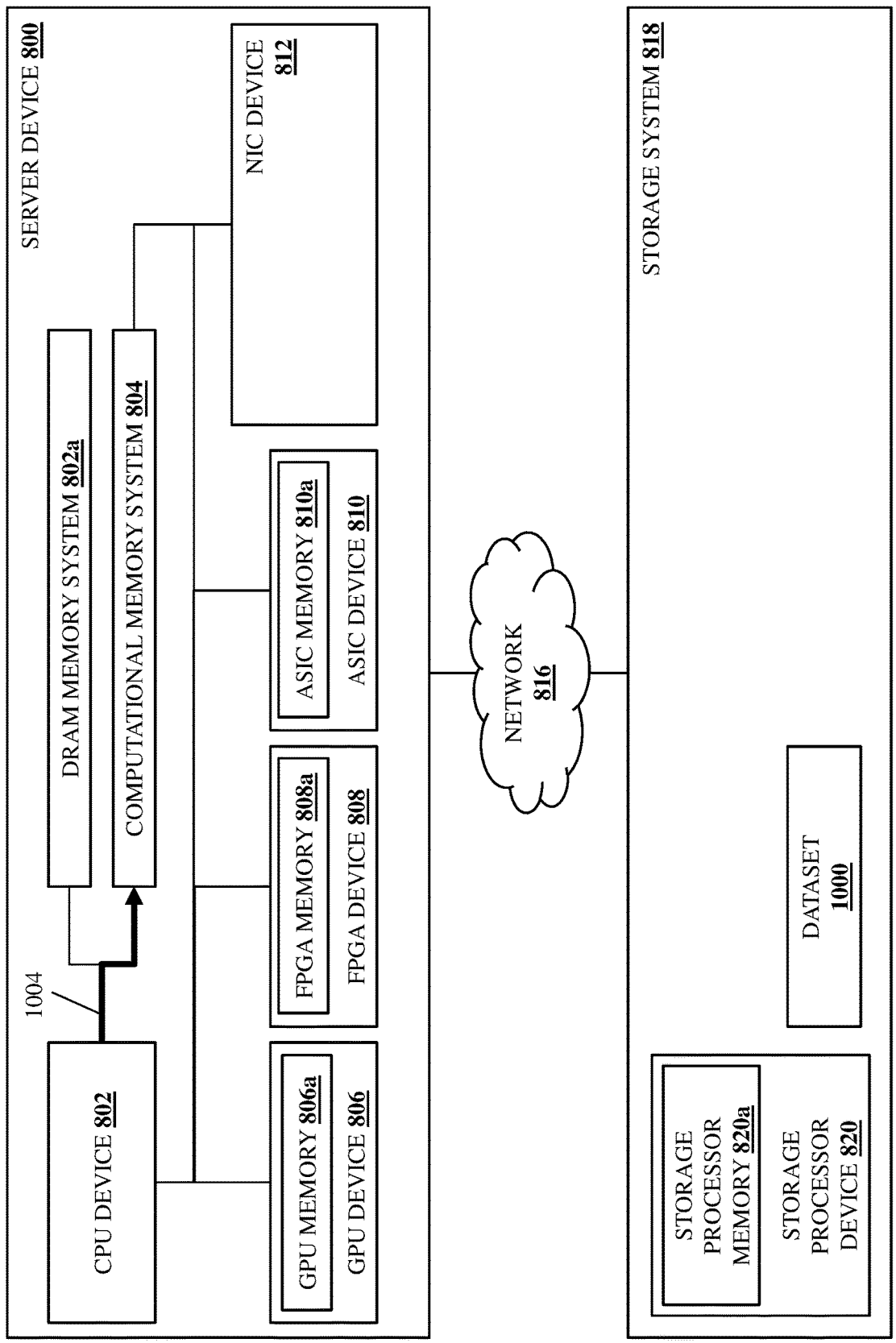
FIG. 10B is a schematic view illustrating an embodiment of the data transformation/processing system of FIG. 8 operating during the method of FIG. 4.

With reference to the example illustrated in FIGS. 10A-10D, in an embodiment of block 412, the request to process data received at block 402 may have identified the source data included in a dataset 1000 that is stored in the storage system 818. As illustrated in FIG. 10A and based on its configuration according to the method 400, the computational memory system 804 may perform data retrieval operations 1002 that include retrieving the source data having a source data format from the storage system 818 via the network 816 and through the NIC device 812 (which does not include the optional DPU device 814 discussed above with reference to FIG. 8), and storing that source data in the computational memory system 804. As illustrated in FIG. 10B and based on its configuration according to the method 400, the CPU device 802 may then perform first data transformation operations 1004 that include performing the first data transformation on the source data stored in the computational memory system 804 in order transform the source data format of that source data to a processing data format that provides for the most efficient/optimal processing operations by the computational memory system 804.

Further still, based on its configuration according to the method 400, the computational memory system 804 may then perform the data processing operations (e.g., the computational memory system 804 may perform query processing) on the source data stored in the computational memory system 804 in order to generate destination data, and as discussed above, the processing data format of the source data provides for the most efficient/optimal processing operations by the computational memory system 804 in generating the destination data. As will be appreciated by one of skill in the art in possession of the present disclosure, the destination data may include a "destination data format" that, in different examples, may be the same as the processing data format of the source data, may be different than the processing data format of the source data and may have been provided as part of the processing operations performed by the computational memory system 804, and/or may include any of a variety of data formats that would be apparent to one of skill in the art in possession of the present disclosure.

Figure 10C:
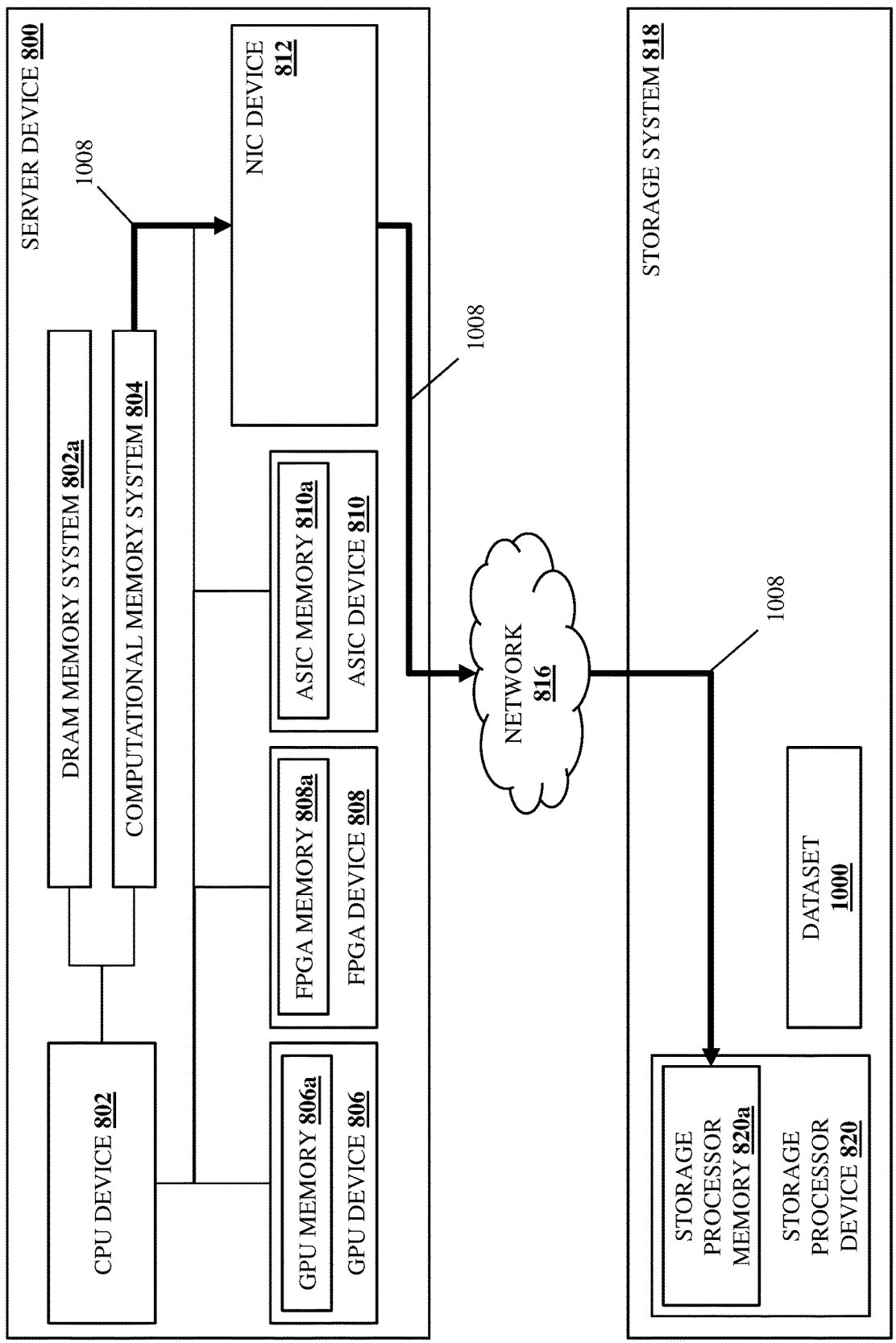
FIG. 10C is a schematic view illustrating an embodiment of the data transformation/processing system of FIG. 8 operating during the method of FIG. 4.
Figure 10D:
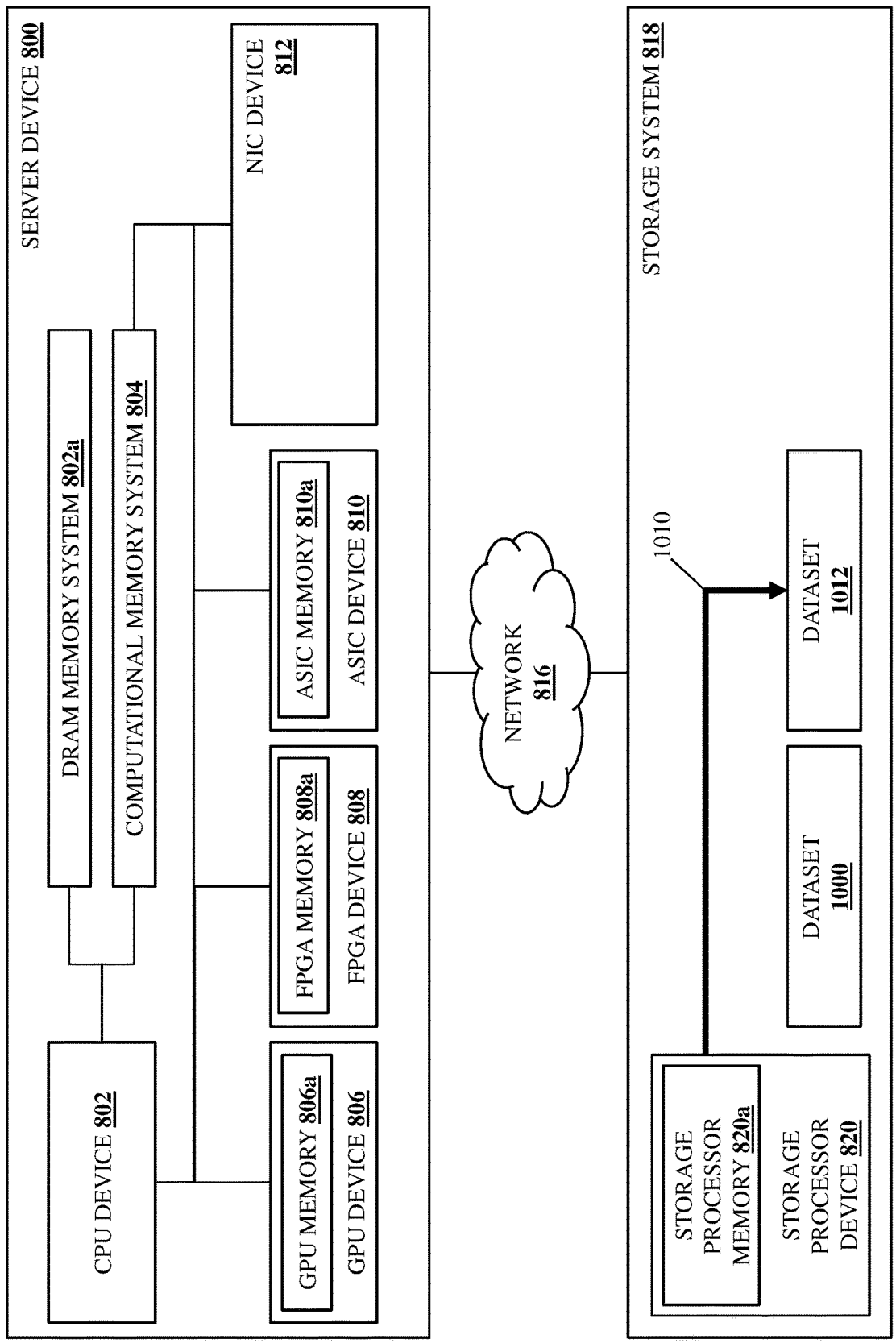
FIG. 10D is a schematic view illustrating an embodiment of the data transformation/processing system of FIG. 8 operating during the method of FIG. 4.

As illustrated in FIG. 10C and based on its configuration according to the method 400, the storage processor device 820 may then perform data retrieval operations 1008 that include retrieving the destination data via the network 816 and through the NIC device 812 from the computational memory system 804, and storing the destination data in the storage processor memory 820*a*. Furthermore, based on its configuration according to the method 400, the storage processor device 820 may then perform second data transformation operations on the destination data stored in the storage processor memory 820*a* in order transform the destination data format of that destination data to a storage data format (e.g., an APACHE PARQUET® data format) that provides for the most efficient/optimal storage of the destination data in the storage system 818. As illustrated in FIG. 10D, the storage processor device 820 may then perform data storage operations 1010 that include providing the destination data having the storage data format for storage in a dataset 1012 in the storage system 818 that may have been identified in the request to process data received at block 402.

The method 400 then proceeds to decision block 414 where it is determined whether the processing operations have completed. In an embodiment, at decision block 414 and following the configuration of the first subset and second subset of the processing systems 208 at block 412, the data transformation/processing management engine 304 in the data transformation/processing management device 202/300 may monitor the performance of the processing of the data requested at block 402 to determine whether that processing has completed. For example, the data transformation/processing management engine 304 may monitor for the storage of the destination data in the first subset of the storage systems 212 in order to determine whether the processing operations have completed at decision block 414, although one of skill in the art in possession of the present disclosure will appreciate how other techniques for determining data processing completion will fall within the scope of the present disclosure as well. If, at decision block 414, it is determined that the processing operations have not completed, the method 400 returns to block 414. As such, the method 400 may loop at decision block 414 such that the data transformation/processing management engine 304 monitors the processing of the data until that processing has been completed.

Figure 11A:
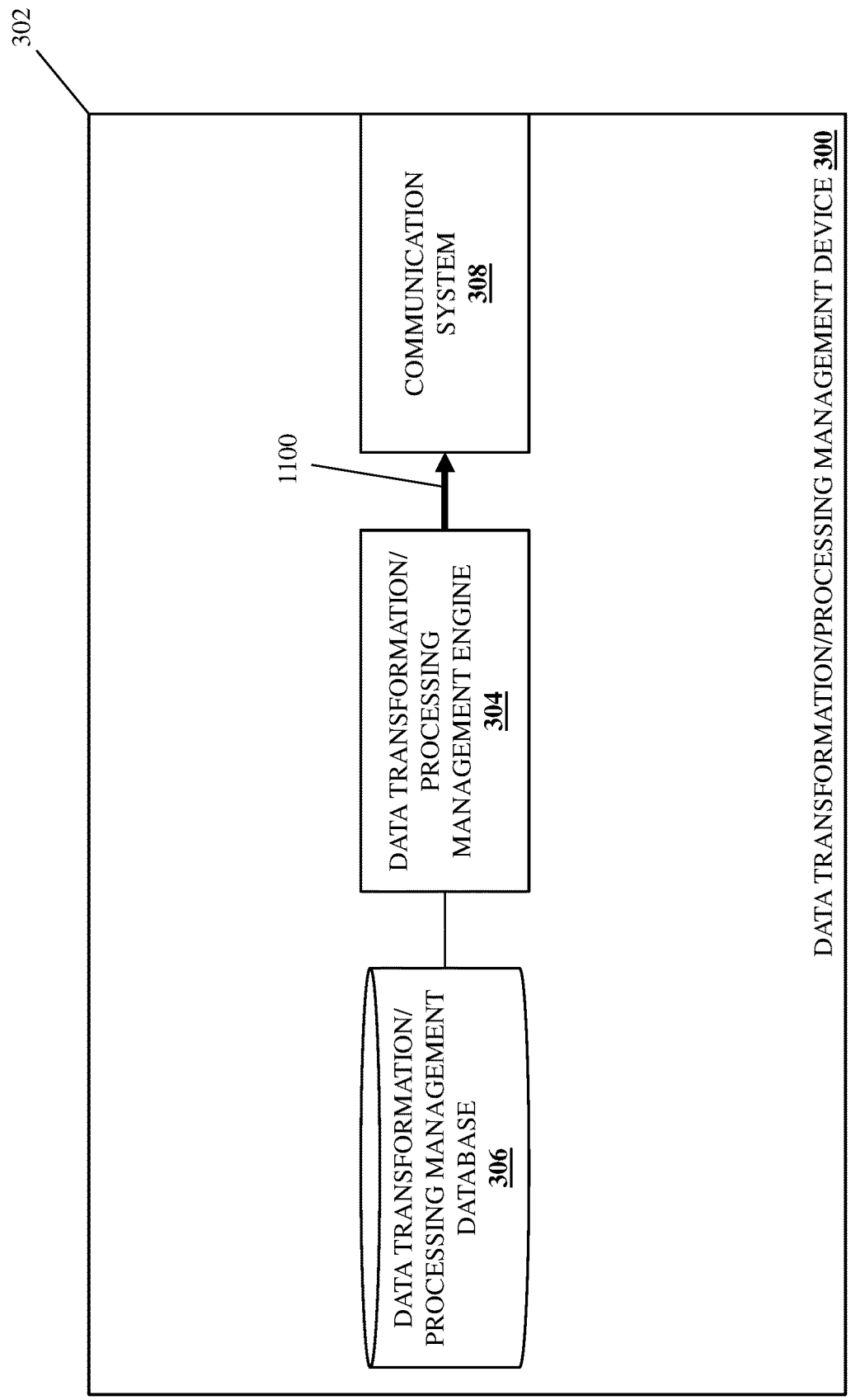
FIG. 11A is a schematic view illustrating an embodiment of the data transformation/processing management device of FIG. 3 operating during the method of FIG. 4.

If, at decision block 406, it is determined that the processing operations have completed, the method 400 proceeds to block 416 where the data transformation/processing management device transmits a data processing request completion to the client device. With reference to FIGS. 11A and 11B, in an embodiment of block 416, the data transformation/processing management engine 304 in the data transformation/processing management device 202/300 may perform data processing requestion completion transmission operations 1100 that include transmitting a data request completion via its communication system 308 and to the client device 204 from which it received the request to process the data at block 402. As such, one of skill in the art in possession of the present disclosure will appreciate how the systems and methods of the present disclosure may not require modifications to conventional client devices with regard to the data processing requests and completion confirmation, as all complexity related to the data transformation and processing by the systems and methods of the present disclosure is hidden from the client devices.

Thus, systems and methods have been described that provide for the transformation of data as it moves along a data path in order to enable efficient processing and persistent storage of that data. For example, the data transformation/processing system of the present disclosure may include a data transformation/processing management device coupled to a client device, processing systems, memory systems, and storage systems. The data transformation/processing management device receives a request from the client device to process first data to generate second data, identifies a first subset of the processing systems for performing processing operations to process the first data, and determines a data path for the processing operations that includes storage locations provided by subsets of the memory systems and the storage systems. The data transformation/processing management device then identifies a second subset of the processing systems in the data path for performing transformation operations to transform the first data for processing and storage in the storage locations, and configures the first subset of the processing systems to perform the processing operations and the second subset of the processing systems to perform the transformation operations. As such, requests from client devices to process data may be satisfied in an efficient manner by optimizing the processing and storage of that data along a data path via which it is processed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data transformation/processing system, comprising:
a client device;
a plurality of processing systems;
a plurality of memory systems;
a plurality of storage systems; and
a data transformation/processing management device that is coupled to the client device, the plurality of processing systems, the plurality of memory systems, and the plurality of storage systems, wherein the data transformation/processing management device is configured to:
receive, from the client device, a request to process first data to generate second data;
determine a first subset of the plurality of processing systems for performing processing operations to process the first data;
identify a data path for performing the processing operations by the first subset of the plurality of processing systems that includes storage locations provided by a first subset of the plurality of memory systems and a first subset of the plurality of storage systems;
determine a second subset of the plurality of processing systems in the data path for performing transformation operations to transform the first data for processing and storage in the storage locations;
configure the first subset of the plurality of processing systems to perform the processing operations; and
configure the second subset of the plurality of processing systems to perform the transformation operations that include:
1) Performing a first transformation operation to generate first transformed data having a data format that is optimized for processing by a first processing system in the first subset of the plurality of processing systems, and 2) providing the first transformed data for storage in a first memory system in the first subset of the plurality of memory systems that is used by the first processing system; or
1) Performing a second transformation operation to generate second transformed data having a data format that is optimized for storage by a first storage system in the first subset of the plurality of storage systems, and 2) providing the second transformed data for storage in the first storage system.

2. The system of claim 1, wherein the request to process the first data identifies a first location of the first data that is included in the first subset of the plurality of storage systems, and a second location of the second data that is included in the first subset of the plurality of storage systems.

3. The system of claim 1, wherein the identifying the data path for performing the processing operations by the first subset of the plurality of processing systems and the determining the second subset of the plurality of processing systems in the data path for performing the transformation operations includes:
identifying a first data path for performing the processing operations by the first subset of the plurality of processing systems;
determining that the first data path does not include a subset of the plurality of processing systems for performing the transformation operations; and
modifying the first data path to provide a second data path that includes the second subset of the plurality of processing systems for performing the transformation operations.

4. The system of claim 1, wherein the first transformation operation generates the first transformed data having a data format that is optimized for processing by one of a Central Processing Unit (CPU) processing system, a Graphical Processing Unit (GPU) processing system, or a Field Programmable Gate Array (FPGA) processing system in the first subset of the plurality of processing systems.

5. The system of claim 1, wherein the second transformation operation generates the second transformed data having one of a columnar optimized data format or a row optimized data format that is optimized for storage by the first storage system in the first subset of the plurality of storage systems.

6. The system of claim 1, wherein the configuring the second subset of the plurality of processing systems to perform the transformation operations includes:
retrieving the first data; and
providing respective transformation information in the first data for each of the transformation operations, wherein the transformation information is configured to cause each of the second subset of the plurality of processing systems to perform one of the transformation operations based on the respective transformation information provided in the first data for that transformation operation.

7. An Information Handling System (IHS), comprising:
a processing system; and
a memory system that is coupled to the processing system and that includes instructions that, when executed by the processing system, cause the processing system to provide a data transformation/processing management engine that is configured to:
receive, from a client device, a request to process first data to generate second data;
determine a first subset of a plurality of processing systems for performing processing operations to process the first data;
identify a data path for performing the processing operations by the first subset of the plurality of processing systems that includes storage locations provided by a first subset of a plurality of memory systems and a first subset of a plurality of storage systems;
determine a second subset of the plurality of processing systems in the data path for performing transformation operations to transform the first data for processing and storage in the storage locations;
configure the first subset of the plurality of processing systems to perform the processing operations; and
configure the second subset of the plurality of processing systems to perform the transformation operations that include:
1) Performing a first transformation operation to generate first transformed data having a data format that is optimized for processing by a first processing system in the first subset of the plurality of processing systems, and 2) providing the first transformed data for storage in a first memory system in the first subset of the plurality of memory systems that is used by the first processing system; or
1) Performing a second transformation operation to generate second transformed data having a data format that is optimized for storage by a first storage system in the first subset of the plurality of storage systems, and 2) providing the second transformed data for storage in the first storage system.

8. The IHS of claim 7, wherein the request to process the first data identifies a first location of the first data that is included in the first subset of the plurality of storage systems, and a second location of the second data that is included in the first subset of the plurality of storage systems.

9. The IHS of claim 7, wherein the identifying the data path for performing the processing operations by the first subset of the plurality of processing systems and the determining the second subset of the plurality of processing systems in the data path for performing the transformation operations includes:
identifying a first data path for performing the processing operations by the first subset of the plurality of processing systems;
determining that the first data path does not include a subset of the plurality of processing systems for performing the transformation operations; and
modifying the first data path to provide a second data path that includes the second subset of the plurality of processing systems for performing the transformation operations.

10. The IHS of claim 7, wherein the first transformation operation generates the first transformed data having a data format that is optimized for processing by one of a Central Processing Unit (CPU) processing system, a Graphical Processing Unit (GPU) processing system, or a Field Programmable Gate Array (FPGA) processing system in the first subset of the plurality of processing systems.

11. The IHS of claim 7, wherein the second transformation operation generates the second transformed data having one of a columnar optimized data format or a row optimized data format that is optimized for storage by the first storage system in the first subset of the plurality of storage systems.

12. The IHS of claim 7, wherein the configuring the second subset of the plurality of processing systems to perform the transformation operations includes:
retrieving the first data; and
providing respective transformation information in the first data for each of the transformation operations, wherein the transformation information is configured to cause each of the second subset of the plurality of processing systems to perform one of the transformation operations based on the respective transformation information provided in the first data for that transformation operation.

13. The IHS of claim 7, wherein the data transformation/processing management engine is configured to:
determine that the second data has been generated and stored in the first subset of the plurality of storage systems and, in response, transmit a data processing completion request to the client device.

14. A method for transforming and processing data, comprising:
receiving, by a data transformation/processing management device from a client device, a request to process first data to generate second data;
determining, by the data transformation/processing management device, a first subset of a plurality of processing systems for performing processing operations to process the first data;
identifying, by the data transformation/processing management device, a data path for performing the processing operations by the first subset of the plurality of processing systems that includes storage locations provided by a first subset of a plurality of memory systems and a first subset of a plurality of storage systems;
determining, by the data transformation/processing management device, a second subset of the plurality of processing systems in the data path for performing transformation operations to transform the first data for processing and storage in the storage locations; and
configuring, by the data transformation/processing management device, the first subset of the plurality of processing systems to perform the processing operations; and configuring the second subset of the plurality of processing systems to perform the transformation operations that include:
- 1) Performing a first transformation operation to generate first transformed data having a data format that is optimized for processing by a first processing system in the first subset of the plurality of processing systems, and 2) providing the first transformed data for storage in a first memory system in the first subset of the plurality of memory systems that is used by the first processing system; or
- 1) Performing a second transformation operation to generate second transformed data having a data format that is optimized for storage by a first storage system in the first subset of the plurality of storage systems, and 2) providing the second transformed data for storage in the first storage system.

15. The method of claim 14, wherein the request to process the first data identifies a first location of the first data that is included in the first subset of the plurality of storage systems, and a second location of the second data that is included in the first subset of the plurality of storage systems.

16. The method of claim 14, wherein the identifying the data path for performing the processing operations by the first subset of the plurality of processing systems and the determining the second subset of the plurality of processing systems in the data path for performing the transformation operations includes:
- identifying, by the data transformation/processing management device, a first data path for performing the processing operations by the first subset of the plurality of processing systems;
- determining, by the data transformation/processing management device, that the first data path does not include a subset of the plurality of processing systems for performing the transformation operations; and
- modifying, by the data transformation/processing management device, the first data path to provide a second data path that includes the second subset of the plurality of processing systems for performing the transformation operations.

17. The method of claim 14, wherein the first transformation operation generates the first transformed data having a data format that is optimized for processing by one of a Central Processing Unit (CPU) processing system, a Graphical Processing Unit (GPU) processing system, or a Field Programmable Gate Array (FPGA) processing system in the first subset of the plurality of processing systems.

18. The method of claim 14, wherein the second transformation operation generates the second transformed data having one of a columnar optimized data format or a row optimized data format that is optimized for storage by the first storage system in the first subset of the plurality of storage systems configuring the second subset of the plurality of processing systems.

19. The method of claim 14, wherein the configuring the second subset of the plurality of processing systems to perform the transformation operations includes:
- retrieving, by the data transformation/processing management device, the first data; and
- providing, by the data transformation/processing management device, respective transformation information in the first data for each of the transformation operations, wherein the transformation information is configured to cause each of the second subset of the plurality of processing systems to perform one of the transformation operations based on the respective transformation information provided in the first data for that transformation operation.

20. The method of claim 14, further comprising:
- determining, by the data transformation/processing management device, that the second data has been generated and stored in the first subset of the plurality of storage systems and, in response, transmit a data processing completion request to the client device.

* * * * *

UNITED STATES PATENT AND TRADEMARK OFFICE
CERTIFICATE OF CORRECTION

PATENT NO. : 12,455,775 B2
APPLICATION NO. : 18/150453
DATED : October 28, 2025
INVENTOR(S) : Gaurav Chawla et al.

It is certified that error appears in the above-identified patent and that said Letters Patent is hereby corrected as shown below:

In the Specification

Column 6, Line 6, "maybe defined" should read --may be defined--

In the Claims

Column 20, Line 20, Claim 1, "Performing" should read --performing--

Column 20, Line 29, Claim 1, "Performing" should read --performing--

Column 22, Line 63, Claim 14, "processing and storage in the storage locations; and" should read --processing and storage in the storage locations;--

Column 23, Line 4, Claim 14, "Performing" should read --performing--

Column 23, Line 12, Claim 14, "Performing" should read --performing--

Column 24, Lines 16-17, Claim 18, delete "configuring the second subset of the plurality of processing systems"

Signed and Sealed this
Twenty-third Day of December, 2025

John A. Squires
*Director of the United States Patent and Trademark Office*